(12) United States Patent
Lim et al.

(10) Patent No.: US 11,086,099 B2
(45) Date of Patent: Aug. 10, 2021

(54) LIGHT-FOLDING CAMERA AND MOBILE DEVICE INCLUDING THE SAME

(71) Applicant: SAMSUNG ELECTRONICS CO., LTD., Suwon-si (KR)

(72) Inventors: Jihyung Lim, Seongnam-si (KR); Seunghak Lee, Hwaseong-si (KR); Hyunsu Jun, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/834,583

(22) Filed: Mar. 30, 2020

(65) Prior Publication Data

US 2021/0048605 A1 Feb. 18, 2021

(30) Foreign Application Priority Data

Aug. 13, 2019 (KR) .................. 10-2019-0098853

(51) Int. Cl.
*H04N 5/225* (2006.01)
*G02B 7/09* (2021.01)
*G02B 13/00* (2006.01)

(52) U.S. Cl.
CPC ............ *G02B 7/09* (2013.01); *G02B 13/009* (2013.01); *G02B 13/0065* (2013.01); *H04N 5/2254* (2013.01); *H04N 5/2257* (2013.01)

(58) Field of Classification Search
CPC .... G02B 13/0065; G02B 13/04; G02B 7/102; G02B 13/009; G02B 13/02; G02B 7/09; G02B 15/04; H04N 5/2258; H04N 5/2254; H04N 5/2257; H04N 5/2253; H04N 5/247

See application file for complete search history.

(56) References Cited

U.S. PATENT DOCUMENTS

2006/0077479 A1 4/2006 Itou
2014/0300799 A1* 10/2014 Yoshino ............ H04N 5/23296
348/347

(Continued)

FOREIGN PATENT DOCUMENTS

JP 1995-067033 3/1995
JP 2000-278586 10/2000

(Continued)

*Primary Examiner* — Mekonnen D Dagnew
(74) *Attorney, Agent, or Firm* — F. Chau & Associates, LLC

(57) ABSTRACT

A light-folding camera includes a light folding device, a light path control device LPC, a first sensor and a second sensor. The light folding device outputs a folded light propagating in a first horizontal direction substantially perpendicular to a vertical direction by changing a light path of a vertical light that is incident on the light folding device in the vertical direction. The light path control device outputs a first light propagating in the first horizontal direction by passing at least a first portion of the folded light, or outputs a second light propagating in a second horizontal direction substantially perpendicular to the vertical direction by changing a light path of at least a second portion of the folded light. The first sensor receives the first light propagating in the first horizontal direction. The second sensor receives the second light propagating in the second horizontal direction.

20 Claims, 29 Drawing Sheets

(56) References Cited

U.S. PATENT DOCUMENTS

| | | | | |
|---|---|---|---|---|
| 2015/0070783 A1* | 3/2015 | Hashimoto | ........ | G02B 27/0025 |
| | | | | 359/708 |
| 2016/0381260 A1* | 12/2016 | Narayanswamy | ... | H04N 5/2258 |
| | | | | 348/360 |
| 2018/0067335 A1 | 3/2018 | Chen et al. | | |
| 2019/0107692 A1 | 4/2019 | Shabtay et al. | | |
| 2021/0103131 A1* | 4/2021 | Shabtay | ............... | G02B 13/009 |

FOREIGN PATENT DOCUMENTS

| | | |
|---|---|---|
| JP | 2006-081089 | 2/2006 |
| JP | 2006-162462 | 6/2006 |

* cited by examiner

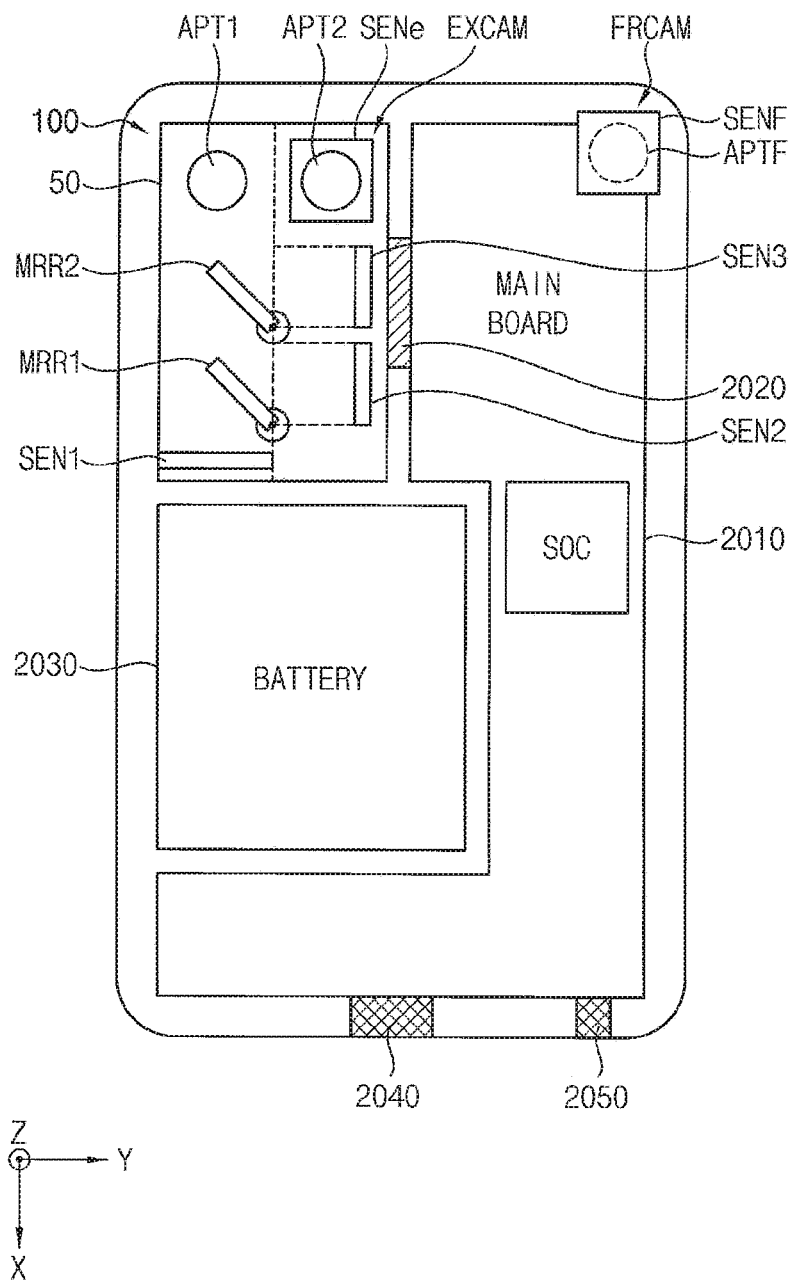

LIGHT-FOLDING CAMERA AND MOBILE DEVICE INCLUDING THE SAME

CROSS-REFERENCE TO RELATED APPLICATIONS

This application claims priority under 35 U.S.C. § 119 to Korean Patent Application No. 10-2019-0098853, filed on Aug. 13, 2019 in the Korean Intellectual Property Office (KIPO), the disclosure of which is incorporated by reference herein in its entirety.

TECHNICAL FIELD

Exemplary embodiments relate generally to semiconductor integrated circuits, and more particularly, to a light-folding camera and a mobile device including the same.

DISCUSSION OF THE RELATED ART

Digital camera modules are currently being incorporated into a variety of host devices, and demand for digital camera modules in host devices continues to grow. It is desirable that a digital camera module is capable of being incorporated into the host device without increasing the host device's overall size. Further, there is an increasing demand for such cameras to have high-performance characteristics. For example, a standalone digital still camera may be implemented to vary the focal length of the camera to increase and decrease the magnification of the image. This ability, typically accomplished with a zoom lens, is known as optical zooming.

The term "zoom" is commonly understood as a capability that provides different magnifications of the same scene and/or object by changing the focal length of an optical system, with a higher level of zoom associated with greater magnification and a lower level of zoom associated with lower magnification. Optical zooming is typically accomplished by mechanically moving lens elements relative to each other. Such zoom lenses are typically more expensive, larger and less reliable than fixed focal length lenses.

An alternative approach for approximating the zoom effect is achieved with a technique known as digital zooming. With digital zooming, instead of varying the focal length of the lens, a processor in the camera crops the image and interpolates between the pixels of the captured image to create a magnified, but lower-resolution image. A multi-aperture imaging system may be used to approximate the effect of a zoom lens. The multi-aperture imaging system (implemented, for example, in a digital camera) includes a plurality of optical sub-systems (also referred to as "sub-cameras"). However, the inclusion of the plurality of optical sub-systems increases the size of the camera or the imaging system.

SUMMARY

Exemplary embodiments may provide a light-folding camera capable of efficiently implementing the functionality of a plurality of cameras, and a mobile system including the light-folding camera.

According to exemplary embodiments, a light-folding camera includes a light folding device, a light path control device, a first sensor and a second sensor. The light folding device outputs a folded light propagating in a first horizontal direction substantially perpendicular to a vertical direction by changing a light path of a vertical light that is incident on the light folding device in the vertical direction. The light path control device outputs a first light propagating in the first horizontal direction by passing at least a first portion of the folded light, or outputs a second light propagating in a second horizontal direction substantially perpendicular to the vertical direction by changing a light path of at least a second portion of the folded light. The first sensor receives the first light propagating in the first horizontal direction. The second sensor receives the second light propagating in the second horizontal direction.

According to exemplary embodiments, a light-folding camera includes a light folding device configured to output a folded light propagating in a first horizontal direction substantially perpendicular to a vertical direction by changing a light path of a vertical light that is incident on the light folding device in the vertical direction. The light-folding camera further includes a first mirror configured to rotate on a first rotation axis extending substantially parallel to the vertical direction between a first passing position and a first reflecting position such that the first mirror is aligned to the first passing position in a first operation mode and is aligned to the first reflecting position in a second operation mode. The folded light passes by the first mirror and is output as a first light propagating in the first horizontal direction in the first operation mode, and the first mirror reflects the folded light and outputs a second light propagating in a second horizontal direction substantially perpendicular to the vertical direction in the second operation mode. The light-folding camera further includes a common lens disposed between the light folding device and the first mirror, the common lens module having a first optical axis extending substantially parallel to the first horizontal direction, a first sensor configured to receive the first light propagating in the first horizontal direction, and a second sensor configured to receive the second light propagating in the second horizontal direction.

According to exemplary embodiments, a mobile device includes a housing case, a main board mounted in the housing case, a light-folding camera mounted in the housing case and electrically connected to the main board, and a camera controller configured to control the light-folding camera and process data provided from the light-folding camera. The light-folding camera includes a light folding device configured to output a folded light propagating in a first horizontal direction substantially perpendicular to a vertical direction by changing a light path of a first vertical light that is incident on the light folding device in the vertical direction through a first aperture, the first aperture being formed at a surface of the housing case. The light-folding camera further includes a light path control device configured to output a first light propagating in the first horizontal direction by passing at least a first portion of the folded light, or output a second light propagating in a second horizontal direction substantially perpendicular to the vertical direction by changing a light path of at least a second portion of the folded light. The light-folding camera further includes a first sensor configured to receive the first light propagating in the first horizontal direction, and a second sensor configured to receive the second light propagating in the second horizontal direction.

The light-folding camera and the mobile device according to exemplary embodiments may have a reduced size by sharing a portion of the light path by a plurality of image sensors. Various image magnifications and functions may be efficiently implemented by integrating a plurality of cameras in the light-folding camera.

BRIEF DESCRIPTION OF THE DRAWINGS

The above and other features of the present inventive concept will become more apparent by describing in detail exemplary embodiments thereof with reference to the accompanying drawings, in which:

FIG. 31 is a diagram illustrating an exemplary embodiment of a layout of the mobile device of FIG. 30.

DETAILED DESCRIPTION OF THE EXEMPLARY EMBODIMENTS

Figure 1:
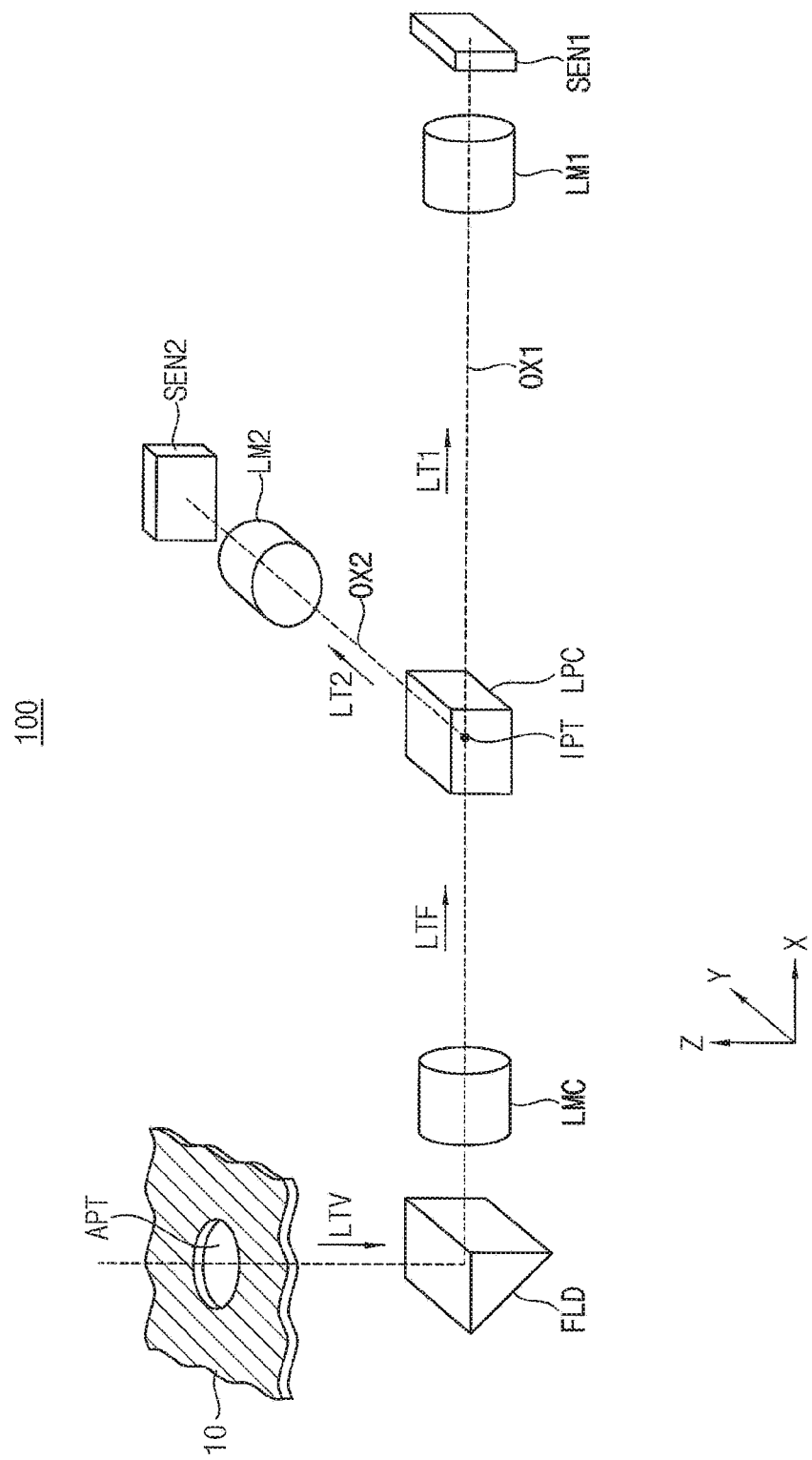
FIG. 1 is a diagram illustrating a perspective view of a light-folding camera according to exemplary embodiments.

Exemplary embodiments will be described more fully hereinafter with reference to the accompanying drawings. Like reference numerals may refer to like elements throughout the accompanying drawings.

It should be understood that the terms "first," "second," "third," etc. are used herein to distinguish one element from another, and the elements are not limited by these terms. Thus, a "first" element in an exemplary embodiment may be described as a "second" element in another exemplary embodiment.

It should be further understood that descriptions of features or aspects within each exemplary embodiment should typically be considered as available for other similar features or aspects in other exemplary embodiments, unless the context clearly indicates otherwise.

As used herein, the singular forms "a", "an" and "the" are intended to include the plural forms as well, unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. Other words used to describe the relationship between elements should be interpreted in a like fashion.

The term "about" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art. Further, when two components or directions are described as extending substantially parallel or perpendicular to each other, the two components or directions extend exactly parallel or perpendicular to each other, or extend approximately parallel or perpendicular to each other within a measurement error as would be understood by a person having ordinary skill in the art.

FIG. 1 is a diagram illustrating a perspective view of a light-folding camera according to exemplary embodiments.

Referring to FIG. 1, a light-folding camera 100 includes a light folding device FLD, a light path control device LPC, a first sensor SEN1 and a second sensor SEN2. According to exemplary embodiments, the light-folding camera 100 may further include a common lens module LMC, a first lens module LM1 and a second lens module LM2.

The light folding device FLD changes a light path of a vertical light LTV that is incident in a vertical direction Z to output a folded light LTF propagating in a first horizontal direction X substantially perpendicular to the vertical direction Z. The vertical light LTV may be provided through an aperture APT formed at a light blocking layer 10 such as, for example, a housing case of a mobile device. The light folding device FLD may be, for example, any optical device capable of changing a light path by about 90 degrees. In exemplary embodiments, the light folding device FLD may be implemented with, for example, a prism or a mirror. The light folding device FLD may also be referred to herein as a light changing device. Further, when light is referred to as being folded, the direction in which the light propagates may be changed.

The light path control device LPC passes at least a portion of the folded light LTF to output a first light LT1 propagating in the first horizontal direction X, or changes a light path of at least a portion of the folded light LTF to output a second light LT2 propagating in a second horizontal direction Y substantially perpendicular to the vertical direction Z. Herein, when a portion of light is described as being passed by the light path control device LPC, the portion of the light may pass by or through the light path control device LPC without being reflected or refracted.

In exemplary embodiments, as will be described with reference to FIGS. 2 through 5, the light path control device LPC may be implemented with a mirror that rotates on a rotation axis substantially parallel to the vertical direction Z. In this case, the light path control device LPC may selectively output one of the first light LT1 and the second light LT2 according to operation modes.

In exemplary embodiments, as will be described with reference to FIG. 6, the light path control device LPC may be implemented with a fixed beam splitter. In this case, the light path control device LPC may simultaneously output both of the first light LT1 and the second light LT2 regardless of the operation modes. Thus, in exemplary embodiments, both the first light LT1 and the second light LT2 may be output at substantially the same time regardless of the operation modes.

The first sensor SEN1 receives the first light LT1 propagating in the first horizontal direction X, and provides sensing data or image data corresponding to the first light LT1.

The second sensor SEN2 receives the second light LT2 propagating in the second horizontal direction Y, and provides sensing data or image data corresponding to the second light LT2.

In exemplary embodiments, the first sensor SEN1 and the second sensor SEN2 may be implemented as various image sensors having different image magnifications. For example, the first sensor SEN1 may be a tele image sensor providing a tele image corresponding to a relatively narrow field of view (FOV), and the second sensor SEN2 may be a wide image sensor providing a wide image corresponding to a relatively wide field of view.

In exemplary embodiments, the first sensor SEN1 and the second sensor SEN2 may be implemented as various sensors having different functions. For example, the first sensor SEN1 may be one of an image sensor, a luminance sensor, a dynamic vision sensor, a depth sensor adopting a time of flight (ToF) scheme, etc., and the second sensor SEN2 may be another one of such sensors.

The common lens module LMC may be disposed between the light folding device FLD and the light path control device LPC such that the common lens module LMC may have a first optical axis OX1 substantially parallel to the first horizontal direction X. For example, the first optical axis OX1 extends in the first horizontal direction X. Herein, when a component such as the common lens module LMC is described as having an optical axis (e.g., the first optical axis OX1), the component may be disposed on the optical axis.

The first lens module LM1 may be disposed between the light path control device LPC and the first sensor SEN such that the first lens module LM1 may have the first optical axis OX1, which is the same as the optical axis of the common lens module LMC. For example, in exemplary embodiments, the first lens module LM1 and the common lens module LMC may share the same optical axis (e.g., the first optical axis OX1).

The second lens module LM2 may be disposed between the light path control device LPC and the second sensor SEN2 such that the second lens module LM2 may have a second optical axis OX2 that intersects with the first optical axis OX1 at an intermediate position IPT on the first optical axis OX1. The second optical axis OX2 may extend substantially perpendicular to the first optical axis OX1.

Each of the common lens module LMC, the first lens module LM1 and the second lens module LM2 may be implemented with a single lens or a combination of two or more lens.

An image magnification or a zoom factor of an image sensor may be determined depending on a relative distance between the image sensor and lenses disposed on a light path, and a focal distance of the lenses. The image magnification of the first sensor SEN1 may be determined depending on the disposition and the characteristics of the common lens module LMC and the first lens module LM1 that are included in the light path between the aperture APT and the first sensor SEN1. The image magnification of the second sensor SEN2 may be determined depending on the disposition and the characteristics of the common lens module LMC and the second lens module LM2 that are included in the light path between the aperture APT and the second sensor SEN2.

The field of view is in inverse proportion to the image magnification, and the image magnification decreases as the field of view increases. In exemplary embodiments, the common lens module LMC, the first lens module LM1 and the second lens module LM2 may be disposed such that the first sensor SEN1 may receive the first light LT1 corresponding to a first field of view and the second sensor SEN2 may receive the second light LT2 corresponding to a second field of view wider than the first field of view. In this case, the first sensor SEN1 may be referred to as a tele sensor and the second sensor SEN2 may be referred to as a wide sensor. The first sensor SEN1 and the second sensor SEN2 may provide respective images which may be referred to as a tele image and a wide image. The wide image reflects a wider field of view and has a higher resolution compared to the tele image.

Referring to a comparative example, an optical zoom and/or a multi-aperture imaging system may be used to implement different image magnifications. In such schemes, image quality may be degraded, and the cost and size of the camera module may be increased.

In contrast, the light-folding camera and the mobile device according to exemplary embodiments may have a reduced size by sharing a portion of the light path by a plurality of image sensors. Various image magnifications and functions may be efficiently implemented by integrating a plurality of cameras in the light-folding camera.

FIGS. 2 through 5 illustrate an exemplary embodiment in which the light path control device LPC in FIG. 1 is implemented with a mirror. In this exemplary embodiment, the light path control device LPC may selectively output one of the first light LT1 and the second light LT2 according to operation modes. Hereinafter, for convenience of explanation, a further description of elements and aspects previously described with reference to FIG. 1 may be omitted.

Referring to FIGS. 2 through 5, a light-folding camera 101 may include a light folding device FLD, a mirror MRR, a first sensor SEN1, a second sensor SEN2, a common lens module LMC, a first lens module LM1 and a second lens module LM2.

The light folding device FLD changes a light path of a vertical light LTV that is incident in a vertical direction Z to output a folded light LTF propagating in a first horizontal direction X substantially perpendicular to the vertical direction Z. The vertical light LTV may be provided through an aperture APT formed at a light blocking layer 10.

The mirror MRR may be configured to rotate on a rotation axis RX substantially parallel to the vertical direction Z (e.g., extending in the vertical direction Z) so that the mirror MRR may be aligned to different positions according to operation modes.

The first sensor SEN1 receives the first light LT1 propagating in the first horizontal direction X, and provides sensing data or image data corresponding to the first light LT1. The second sensor SEN2 receives the second light LT2 propagating in the second horizontal direction Y, and provides sensing data or image data corresponding to the second light LT2.

The common lens module LMC may be disposed between the light folding device FLD and the mirror MRR such that the common lens module LMC may have a first optical axis OX1 substantially parallel to the first horizontal direction X. For example, the first optical axis OX1 may extend in the first horizontal direction X. The first lens module LM1 may be disposed between the mirror MRR and the first sensor SEN1 such that the first lens module LM1 may have the first optical axis OX1, which is the same as the optical axis of the common lens module LMC. For example, the first lens module LM1 and the common lens module LMC may share the same optical axis (e.g., the first optical axis OX1). The second lens module LM2 may be disposed between the mirror MRR and the second sensor SEN2 such that the second lens module LM2 may have a second optical axis OX2 that intersects with the first optical axis OX1 at an intermediate position IPT on the first optical axis OX1. The second optical axis OX2 may be substantially perpendicular to the first optical axis OX1.

Figure 2:
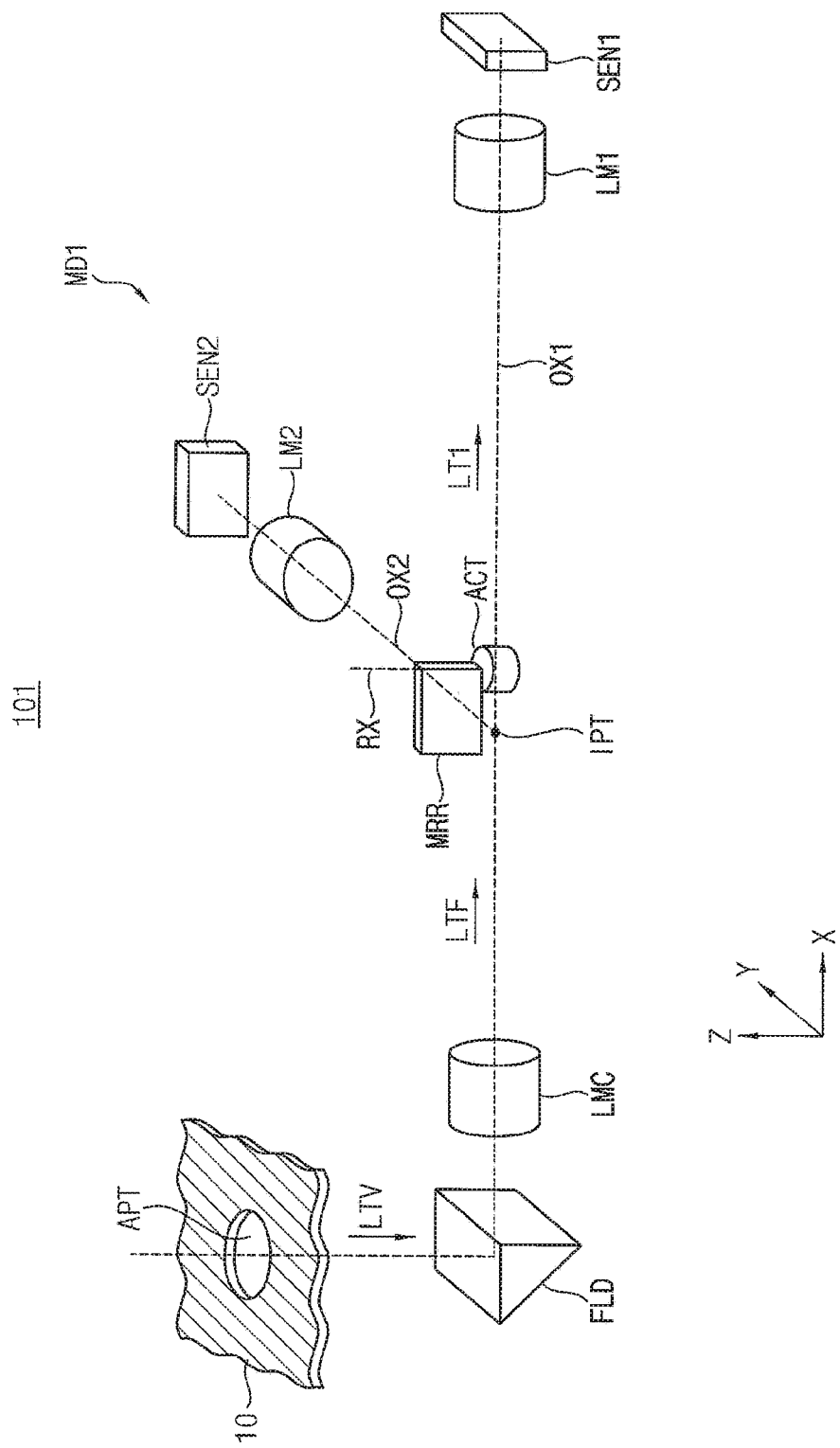
FIGS. 2 and 3 are diagrams illustrating a first operation mode of a light-folding camera according to exemplary embodiments.
Figure 3:
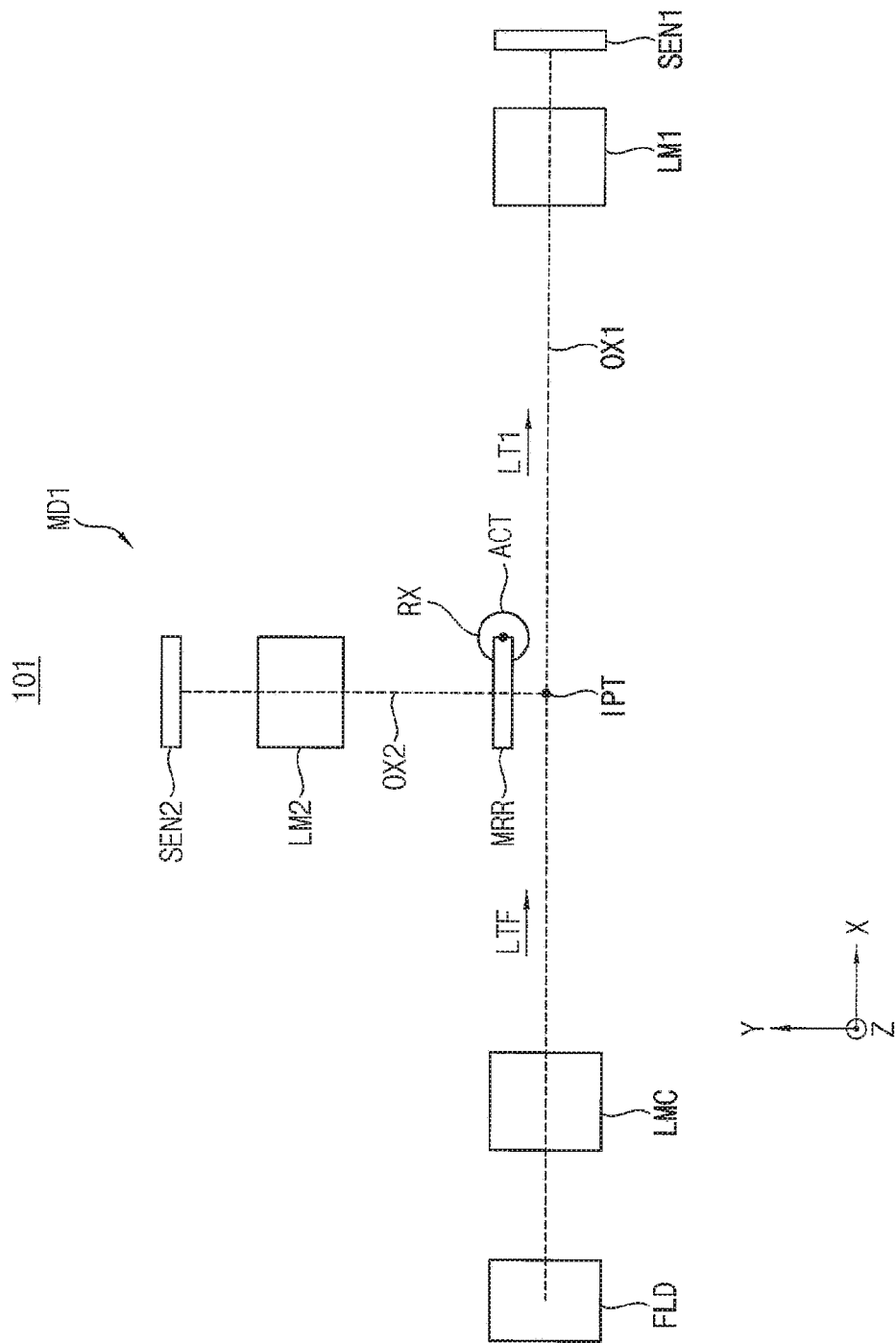
Figure 4:
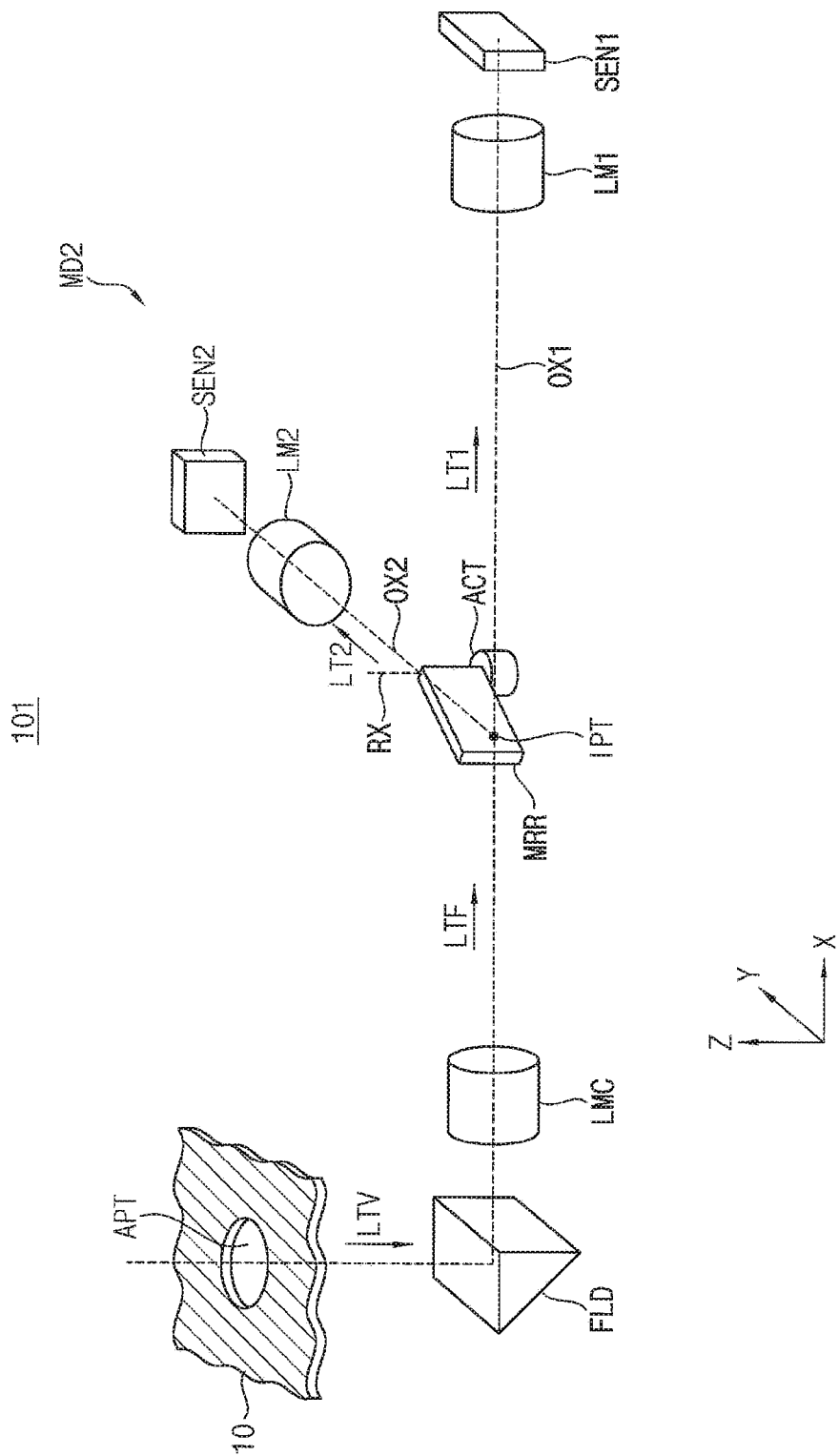
FIGS. 4 and 5 are diagrams illustrating a second operation mode of a light-folding camera according to exemplary embodiments.
Figure 5:
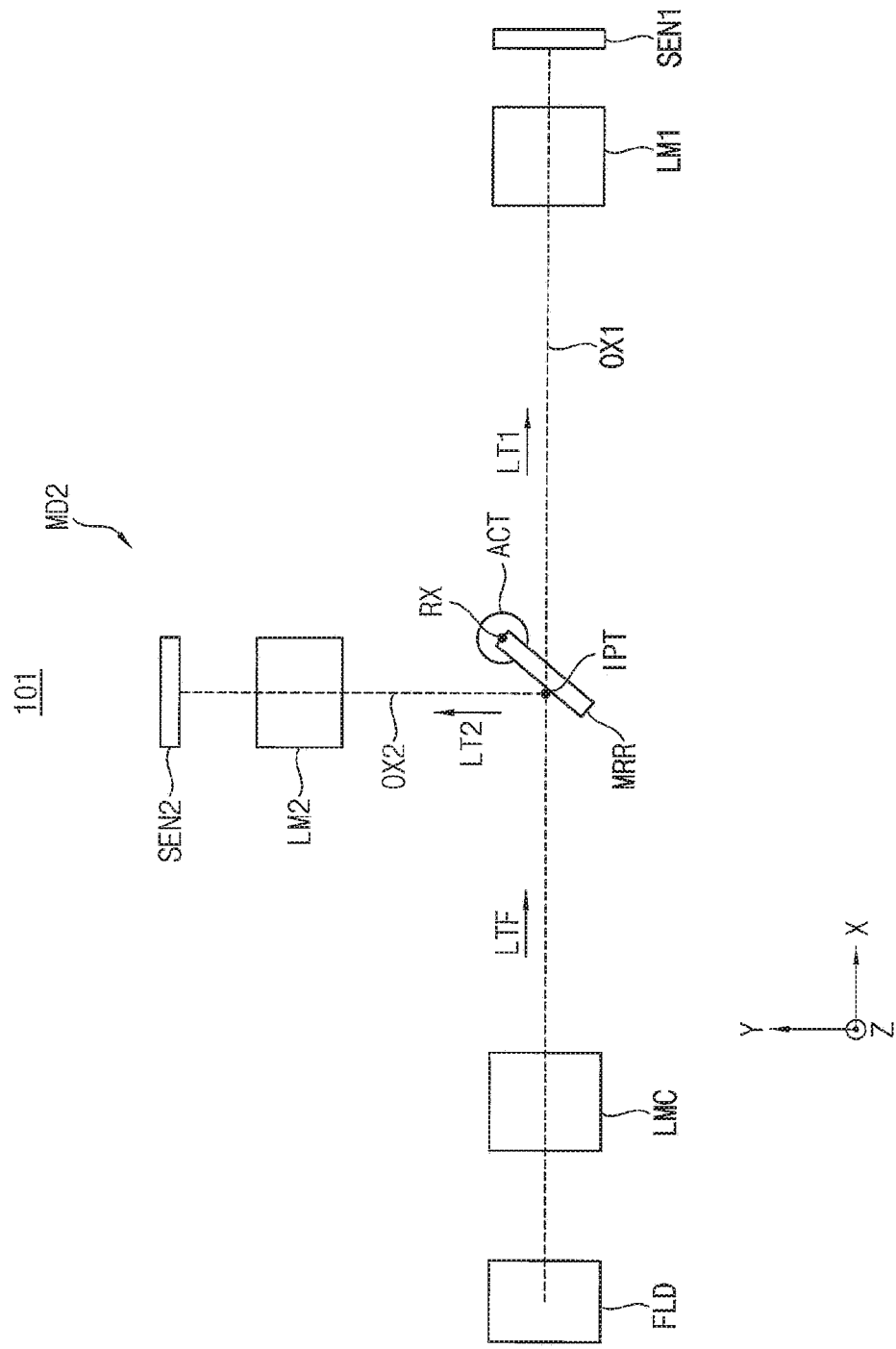

FIGS. 2 and 3 are diagrams illustrating a first operation mode of a light-folding camera according to exemplary embodiments, and FIGS. 4 and 5 are diagrams illustrating a second operation mode of a light-folding camera according to exemplary embodiments. FIGS. 2 and 4 are perspective views illustrating a disposition of the light-folding camera 101 in the respective operation modes, and FIGS. 3 and 5 are top views illustrating the disposition of the light-folding camera 101 in the respective operation modes.

Referring to FIGS. 2 and 3, the mirror MRR may be aligned to a passing position in a first operation mode MD1 to pass the folded light LTF and output the first light LT1. The passing position indicates a position in which the mirror MRR is aligned substantially parallel to the XZ-plane, and in which the mirror MRR does not affect the propagation of the folded light LTF. For example, the passing position refers to a position in which the mirror MRR is placed outside of the path of the folded light LTF to allow the folded light LTF to pass by the mirror MRR without being reflected by the mirror MRR. As a result, the folded light LTF, as output by the light folding device FLD without being further reflected, may be transferred as the first light LT1 to the first sensor SEN1.

Referring to FIGS. 4 and 5, the mirror MRR may be aligned to a reflecting position in a second operation mode MD2 to reflect the folded light LTF and output the second light LT2. The reflecting position indicates a position in which a center portion of a reflecting surface of the mirror MRR is aligned to the intermediate position IPT so as to reflect the folded light LTF. For example, the reflecting position refers to a position in which the mirror MRR is placed in the path of the folded light LTF to reflect the folded light LTF. As a result, the folded light LTF may be reflected and transferred as the second light LT2 to the second sensor SEN2.

As such, the mirror MRR may be aligned to the passing position in the first operation mode MD1, and to the reflecting position in the second operation mode MD2, using an actuator ACT controlled to perform a rotating operation of the mirror MRR. For example, the actuator ACT may rotate the mirror MRR to align the mirror to the passing position in the first operation mode MD1 and to align the mirror to the reflecting position in the second operation mode MD2.

In exemplary embodiments, the first horizontal direction X and the second horizontal direction Y may be substantially perpendicular to each other. In this case, the actuator ACT may be controlled such that the passing position and the reflecting position of the mirror MRR may form a rotation angle of about 45 degrees. For example, the folded light LTF may be incident on the reflecting surface of the mirror MRR with an incident angle of about 45 degrees and a reflection angle of about 45 degrees when the mirror MRR is aligned to the reflecting position.

As such, the light-folding camera 101 according to exemplary embodiments may have a reduced size by sharing a portion of the light path by the first sensor SEN1 and the second sensor SEN2. Various image magnifications and functions may be efficiently implemented by integrating a plurality of cameras in the light-folding camera 101.

Figure 6:
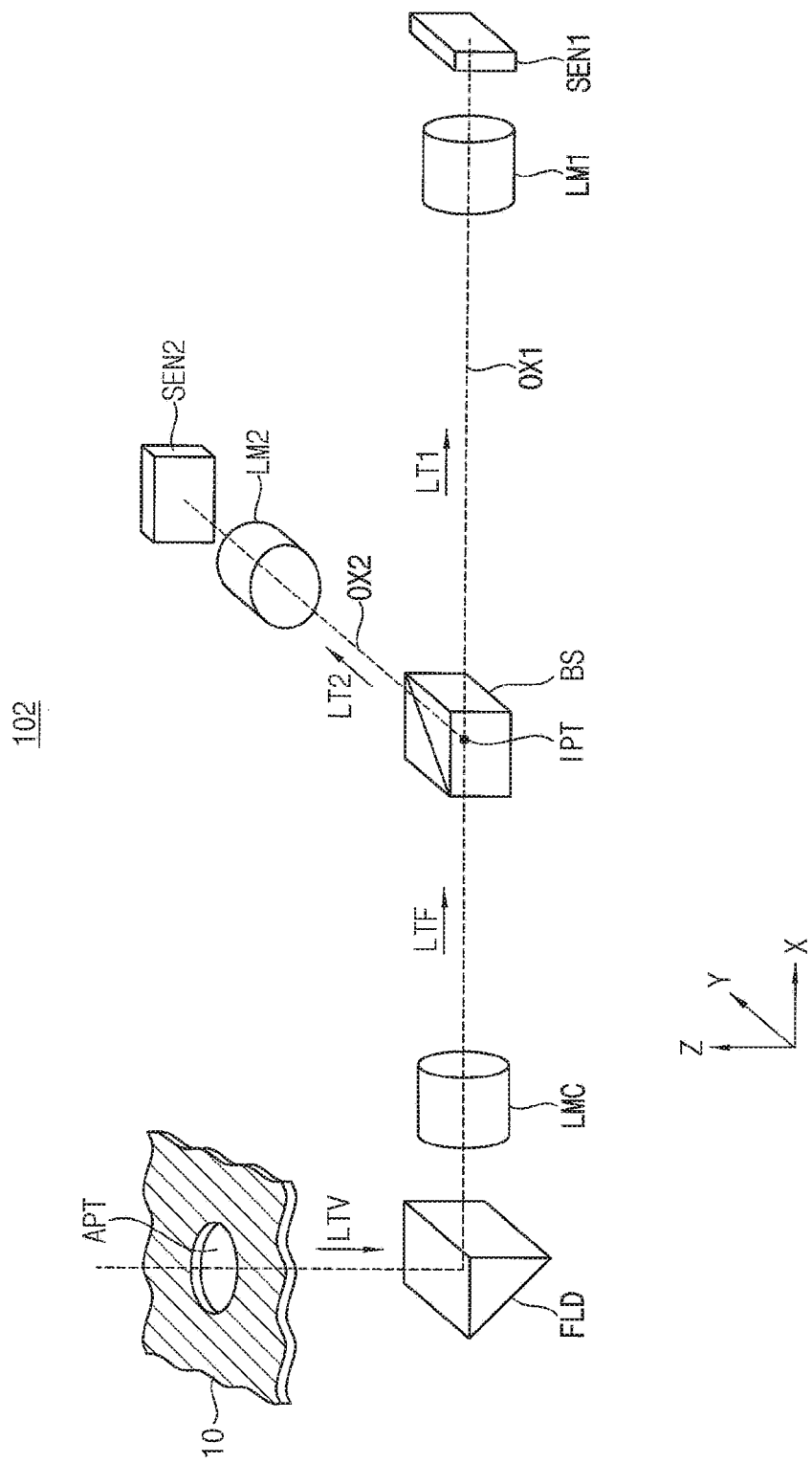
FIGS. 6 and 7 are diagrams illustrating a perspective view of a light-folding camera according to exemplary embodiments.
Figure 7:
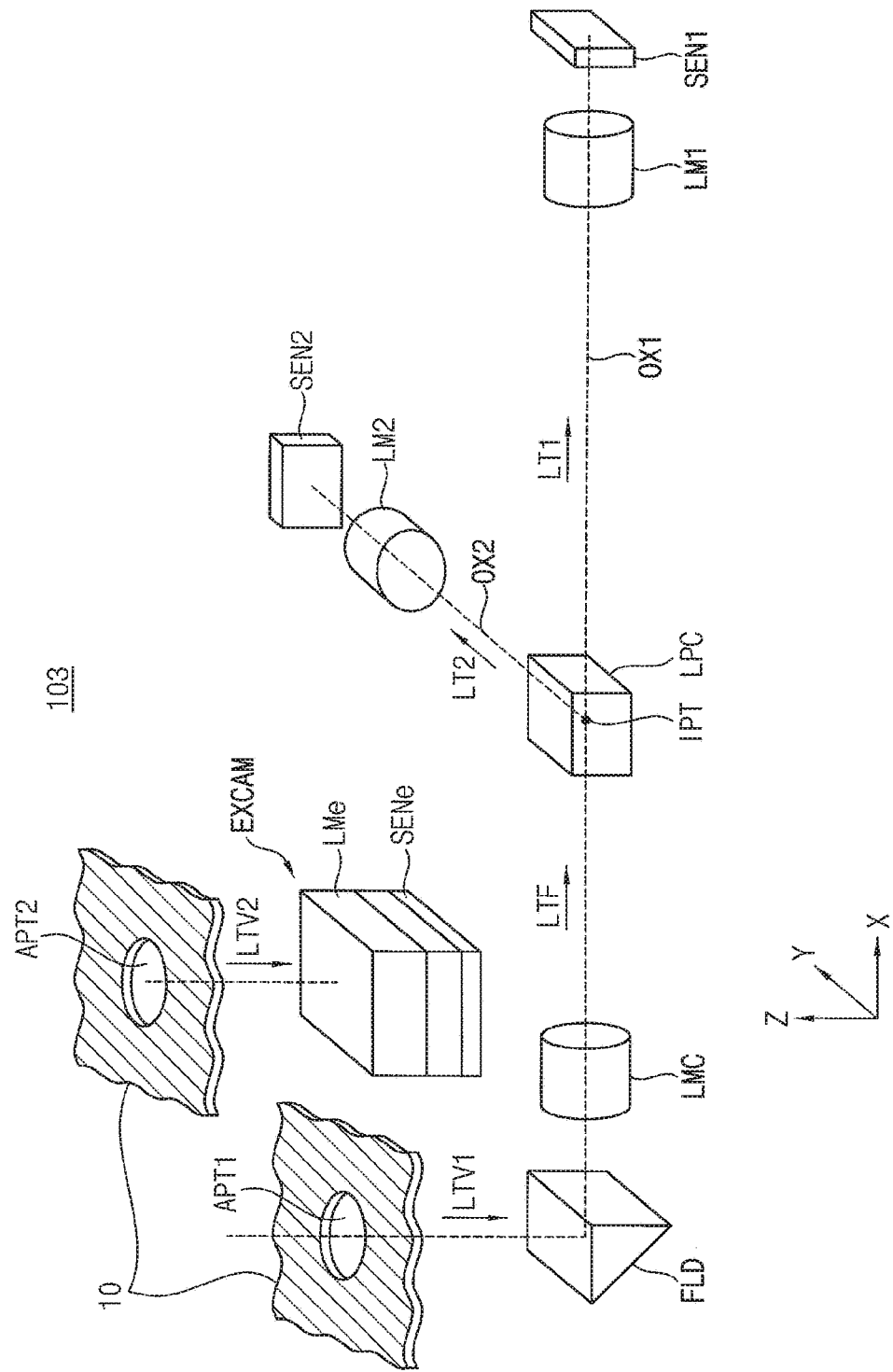

FIGS. 6 and 7 are diagrams illustrating a perspective view of a light-folding camera according to exemplary embodiments.

FIG. 6 illustrates an exemplary embodiment in which the light path control device LPC in FIG. 1 is implemented with a beam splitter. In this exemplary embodiment, the light path control device LPC may simultaneously output both of the first light LT1 and the second light LT2 regardless of the operation modes. Hereinafter, for convenience of explanation, a further description of elements and aspects previously described with reference to FIG. 1 may be omitted.

Referring to FIG. 6, a light-folding camera 102 may include a light folding device FLD, a beam splitter BS, a first sensor SEN1, a second sensor SEN2, a common lens module LMC, a first lens module LM1 and a second lens module LM2.

The light folding device FLD changes a light path of a vertical light LTV that is incident in a vertical direction Z to output a folded light LTF propagating in a first horizontal direction X substantially perpendicular to the vertical direction Z. The vertical light LTV may be provided through an aperture APT formed at a light blocking layer 10.

The beam splitter BS may pass a portion of the folded light LTF to output the first light LT1, and simultaneously reflect another portion of the folded light LTF to output the second light LT2. For example, the beam splitter BS may output the first light LT1 and the second light LT2 at substantially the same time.

The first sensor SEN1 receives the first light LT1 propagating in the first horizontal direction X, and provides sensing data or image data corresponding to the first light LT1. The second sensor SEN2 receives the second light LT2 propagating in the second horizontal direction Y, and provides sensing data or image data corresponding to the second light LT2.

The common lens module LMC may be disposed between the light folding device FLD and the beam splitter BS such that the common lens module LMC may have a first optical axis OX1 substantially parallel to the first horizontal direction X. For example, the first optical axis OX1 extends in the first horizontal direction X. The first lens module LM1 may be disposed between the beam splitter BS and the first sensor SEN1 such that the first lens module LM1 may have the first optical axis OX1, which is the same as the optical axis of the common lens module LMC. For example, the first lens module LM1 and the common lens module LMC may share the same optical axis (e.g., the first optical axis OX1). The second lens module LM2 may be disposed between the beam splitter BS and the second sensor SEN2 such that the second lens module LM2 may have a second optical axis OX2 that intersects with the first optical axis OX1 at an intermediate position IPT. The second optical axis OX2 is substantially perpendicular to the first optical axis OX1.

According to exemplary embodiments, when the light path control device LPC is implemented as the mirror MRR as described with reference to FIGS. 2 through 5, the first light LT1 and the second light LT2 are not provided simultaneously, however, the light loss may be minimized/reduced to increase the intensity of the first light LT1 and the second light LT2. In contrast, when the light path control device LPC is implemented as the beam splitter BS as described with reference to FIG. 6, the intensity of the first light LT1 and the second light LT2 may be decreased, and the first light LT1 and the second light LT2 may be provided simultaneously.

Referring to FIG. 7, a light-folding camera 103 may include a light folding device FLD, a light path control device LPC, a first sensor SEN1, a second sensor SEN2, a common lens module LMC, a first lens module LM1, a second lens module LM2 and an extra camera EXCAM. The light-folding camera 103 of FIG. 7 is substantially the same as the light-folding camera 100 of FIG. 1, except for the inclusion of the extra camera EXCAM. Thus, for convenience of explanation, a further description of elements and aspects previously described with reference to FIG. 1 may be omitted.

The light folding device FLD may receive a first vertical light LTV1 that is incident in the vertical direction Z through a first aperture APT1 formed at a light blocking layer 10, and the extra camera EXCAM may receive a second vertical light LTV2 that is incident in the vertical direction Z through a second aperture APT2 formed at the light blocking layer 10. The extra camera EXCAM may include an extra sensor SENe configured to receive the second vertical light LTV2, and an extra lens module LMe disposed between the second aperture APT2 and the extra sensor SENe.

The first sensor SEN1 and the second sensor SEN2 may perform functions requiring a relatively long focal distance because they receive the first light LT1 and the second light LT2, respectively, which are folded once or twice by the light folding device FLD and the light path control device LPC. In contrast, the extra sensor SENe may perform functions requiring a relatively short focal distance because it receives the second vertical light LTV2 which is not folded.

In some exemplary embodiments, the extra camera EXCAM may be mounted on the same substrate as the other components of the light-folding camera 103. In other exemplary embodiments, the extra sensor EXCAM may be separated from the substrate on which the other components of the light-folding camera 103 are mounted.

FIGS. 8 through 13 illustrate an exemplary embodiment in which the light path control device LPC in FIG. 1 is implemented with two mirrors and in which three sensors are integrated. In this exemplary embodiment, the light path control device LPC may selectively output one of a first light LT1, a second light LT2 and a third light LT3 according to operation modes.

Referring to FIGS. 8 through 13, a light-folding camera 104 may include a light folding device FLD, a first mirror MRR1, a second mirror MRR2, a first sensor SEN1, a second sensor SEN2, a third sensor SEN3, a common lens module LMC, a first lens module LM1, a second lens module LM2 and a third lens module LM3.

The light folding device FLD changes a light path of a vertical light LTV that is incident in a vertical direction Z to output a folded light LTF propagating in a first horizontal direction X substantially perpendicular to the vertical direction Z. The vertical light LTV may be provided through an aperture APT formed at a light blocking layer 10 such as, for example, a housing case of a mobile device. The light folding device FLD may be, for example, any optical device capable of changing a light path by about 90 degrees. In exemplary embodiments, the light folding device FLD may be implemented with, for example, a prism or a mirror.

The first mirror MRR1 may be configured to rotate on a first rotation axis RX1 substantially parallel to the vertical direction Z (e.g., extending in the vertical direction Z) so that the first mirror MRR1 may be aligned to different positions according to operation modes. In addition, the second mirror MRR2 may be configured to rotate on a second rotation axis RX2 substantially parallel to the vertical direction Z (e.g., extending in the vertical direction Z) so that the second mirror MRR2 may be aligned to different positions according to the operation modes. For example, the first mirror MRR1 may be mounted on a first actuator ACT1 to perform a rotating operation based on an external control signal, and the second mirror MRR2 may be mounted on a second actuator ACT2 to perform a rotating operation based on an external control signal.

The first sensor SEN1 receives the first light LT1 propagating in the first horizontal direction X, and provides sensing data or image data corresponding to the first light LT1. The second sensor SEN2 receives the second light LT2 propagating in the second horizontal direction Y, and provides sensing data or image data corresponding to the second light LT2. The third sensor SEN3 receives the third light LT3 propagating in the second horizontal direction Y, and provides sensing data or image data corresponding to the third light LT3.

In exemplary embodiments, the first sensor SEN1, the second sensor SEN2 and the third sensor SEN3 may be implemented as various image sensors having different image magnifications. For example, the first sensor SEN1 may be a tele image sensor providing a tele image corresponding to a first field of view, the second sensor SEN2 may be a wide image sensor providing a wide image corresponding to a second field of view wider than the first field of view, and the third sensor SEN3 may be an ultra-wide image sensor providing an ultra-wide image corresponding to a third field of view wider than the second field of view.

In exemplary embodiments, the first sensor SEN1, the second sensor SEN2 and the third sensor SEN3 may be implemented as various sensors having different functions. For example, the first sensor SEN1 and the second sensor SEN2 may be image sensors having different image magnifications, and the third sensor SEN3 may be one of, for example, a luminance sensor, a dynamic vision sensor, a depth sensor adopting a time of flight (ToF) scheme, etc.

The common lens module LMC may be disposed between the light folding device FLD and the second mirror MRR2 such that the common lens module LMC may have a first optical axis OX1 substantially parallel to the first horizontal direction X. For example, the first optical axis OX1 may extend in the first horizontal direction X. The first lens module LM1 may be disposed between the first mirror MRR1 and the first sensor SEN1 such that the first lens module LM1 may have the first optical axis OX1, which is the same as the optical axis of the common lens module LMC. For example, the first lens module LM1 and the common lens module LMC may share an optical axis (e.g., the first optical axis OX1). The second lens module LM2 may be disposed between the first mirror MRR1 and the second sensor SEN2 such that the second lens module LM2 may have a second optical axis OX2 that intersects with the first optical axis OX1 at an intermediate position IPT1 on the first optical axis OX1. The second optical axis OX2 may be substantially perpendicular to the first optical axis OX1. The third lens module LM3 may be disposed between the second mirror MRR2 and the third sensor SEN3 such that the third lens module LM3 may have a third optical axis OX3 that intersects with the first optical axis OX1 at an intermediate position IPT2 on the first optical axis OX1. The third optical axis OX3 may be substantially perpendicular to the first optical axis OX1. The first optical axis OX1 may extend in the first horizontal direction X, and the second optical axis OX2 and the third optical axis OX3 may extend in the second horizontal direction Y.

Each of the common lens module LMC, the first lens module LM1, the second lens module LM2 and the third lens module LM3 may be implemented with a single lens or a combination of two or more lens.

Figure 8:
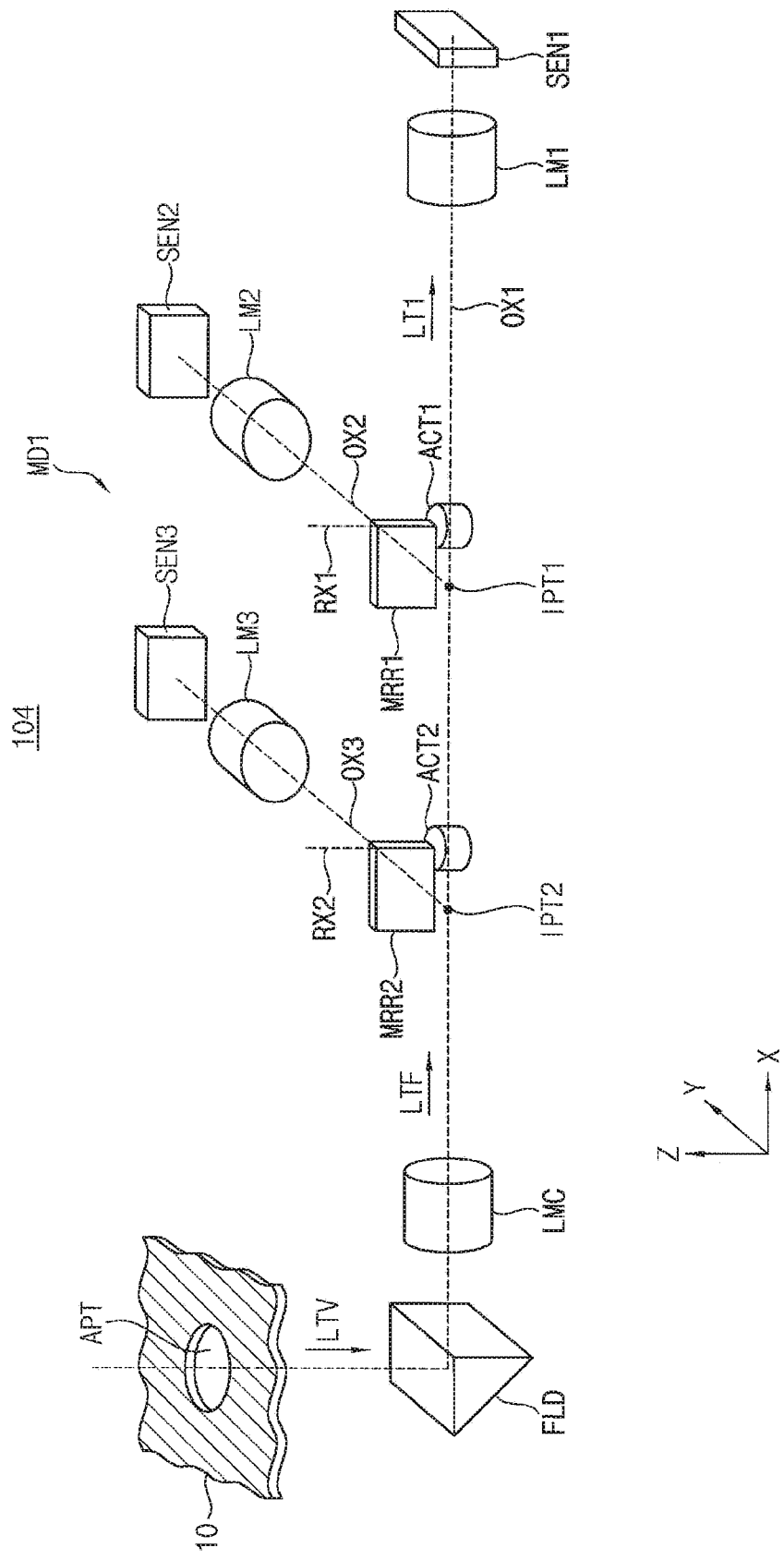
FIGS. 8 and 9 are diagrams illustrating a first operation mode of a light-folding camera according to exemplary embodiments.
Figure 9:
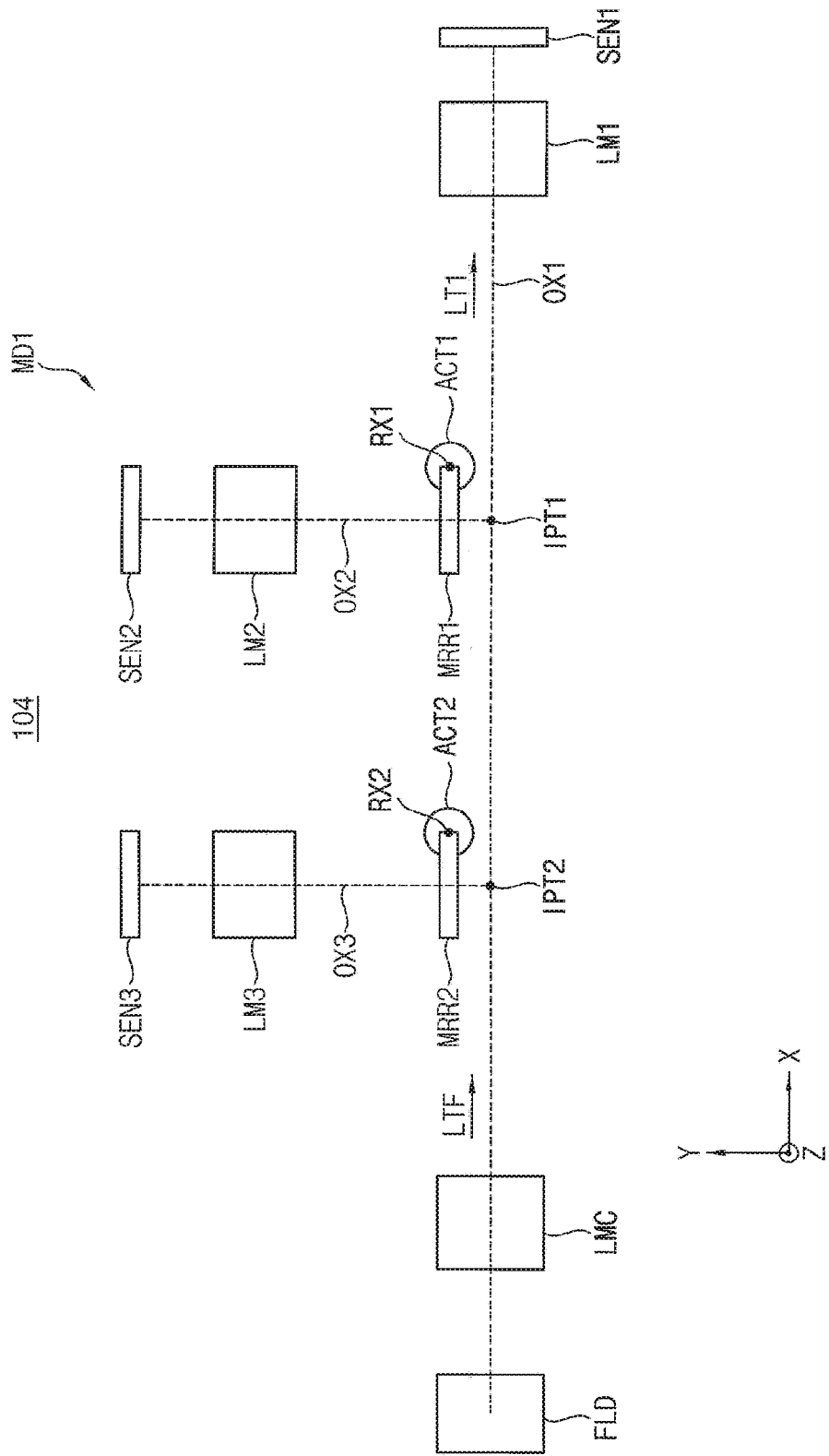
Figure 10:
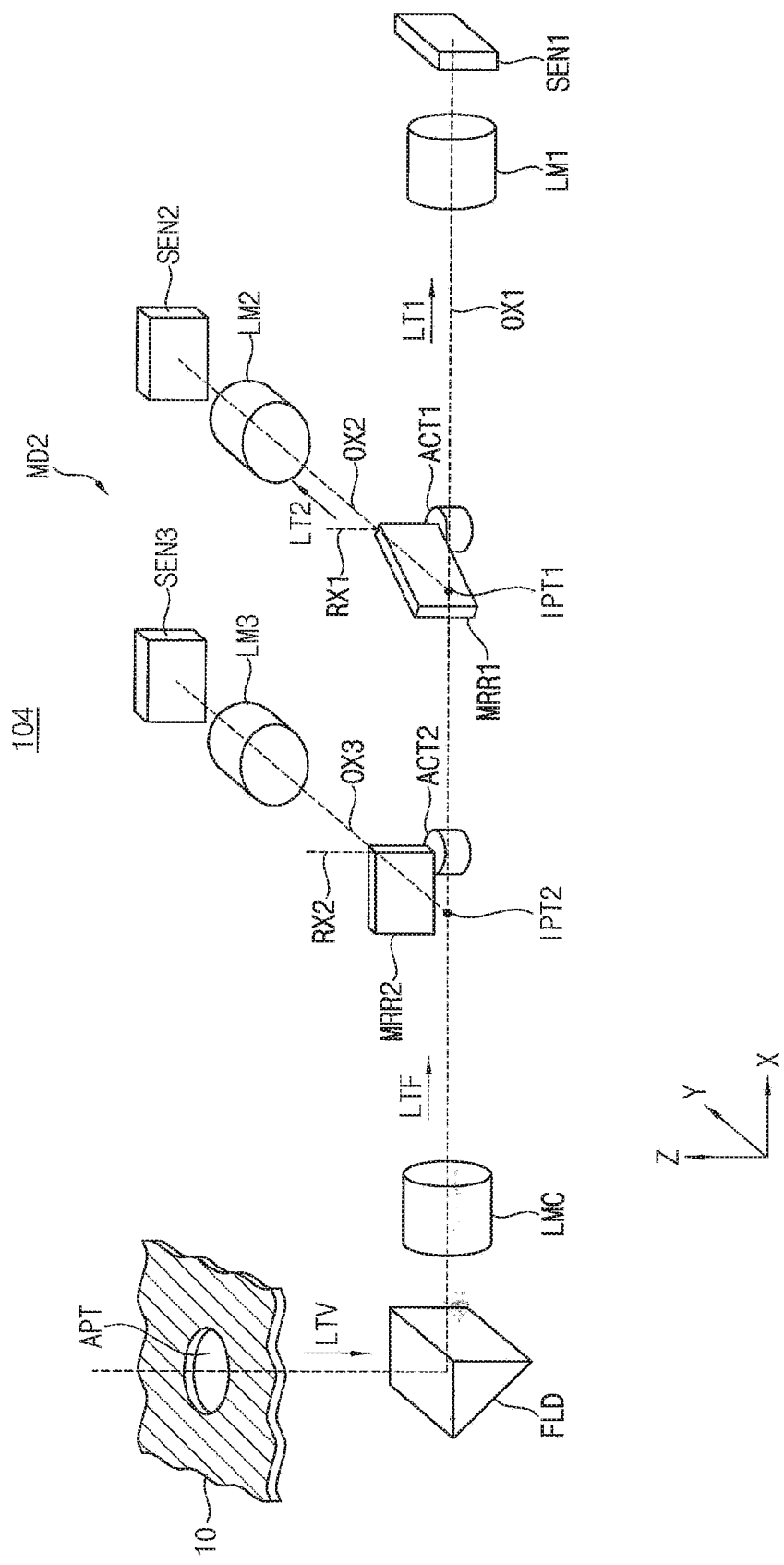
FIGS. 10 and 11 are diagrams illustrating a second operation mode of a light-folding camera according to exemplary embodiments.
Figure 11:
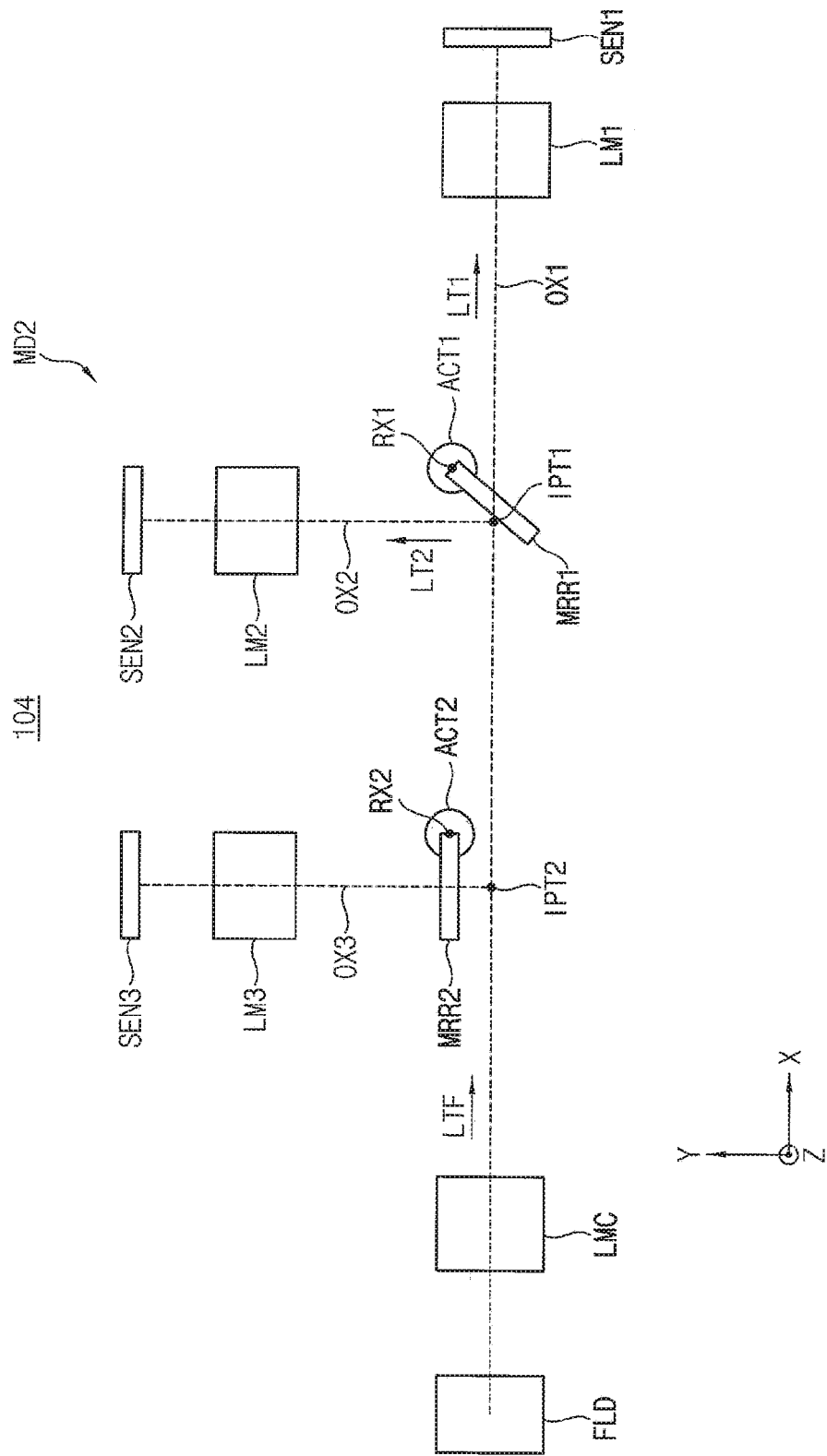
Figure 12:
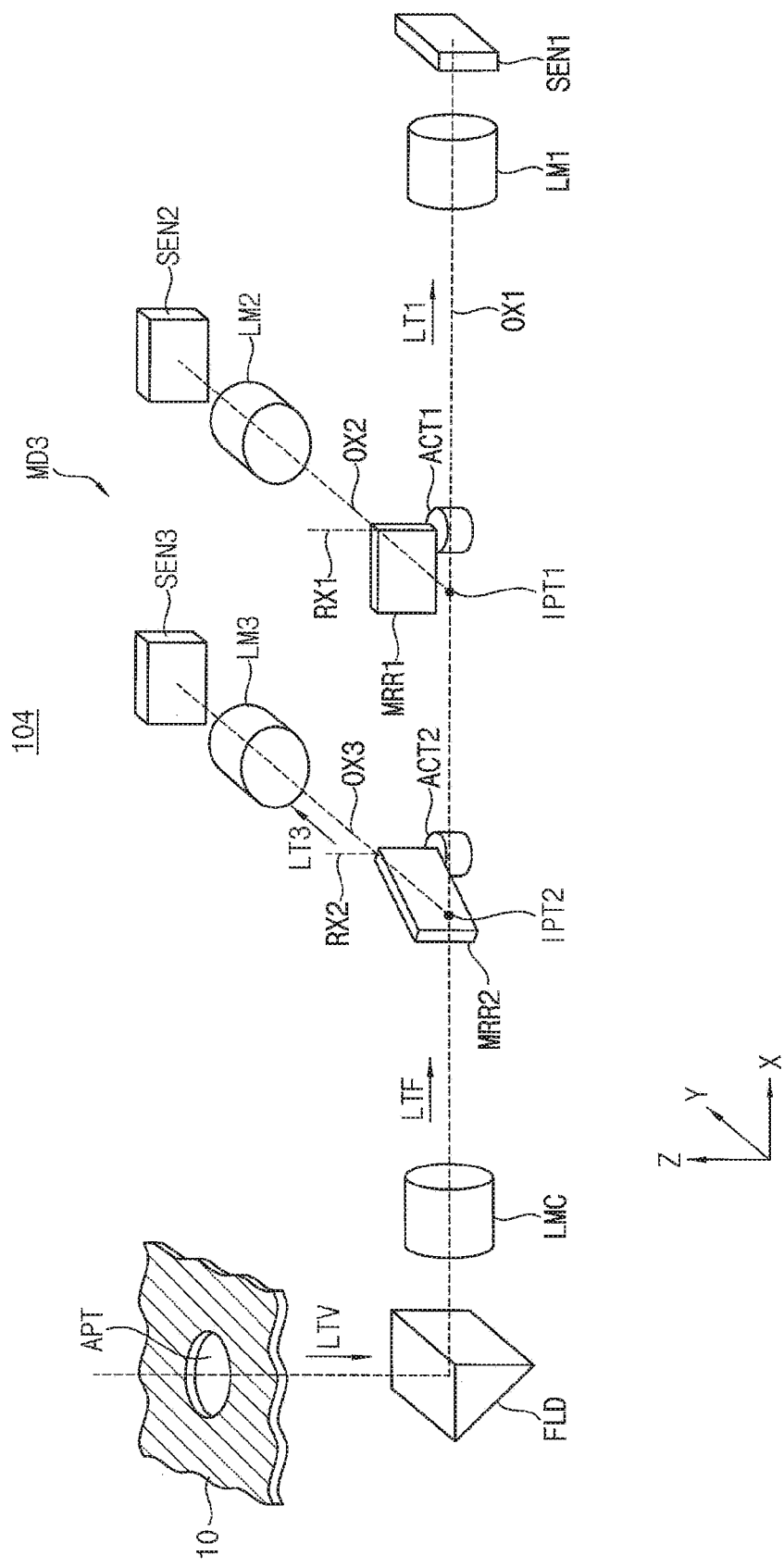
FIGS. 12 and 13 are diagrams illustrating a third operation mode of a light-folding camera according to exemplary embodiments.
Figure 13:
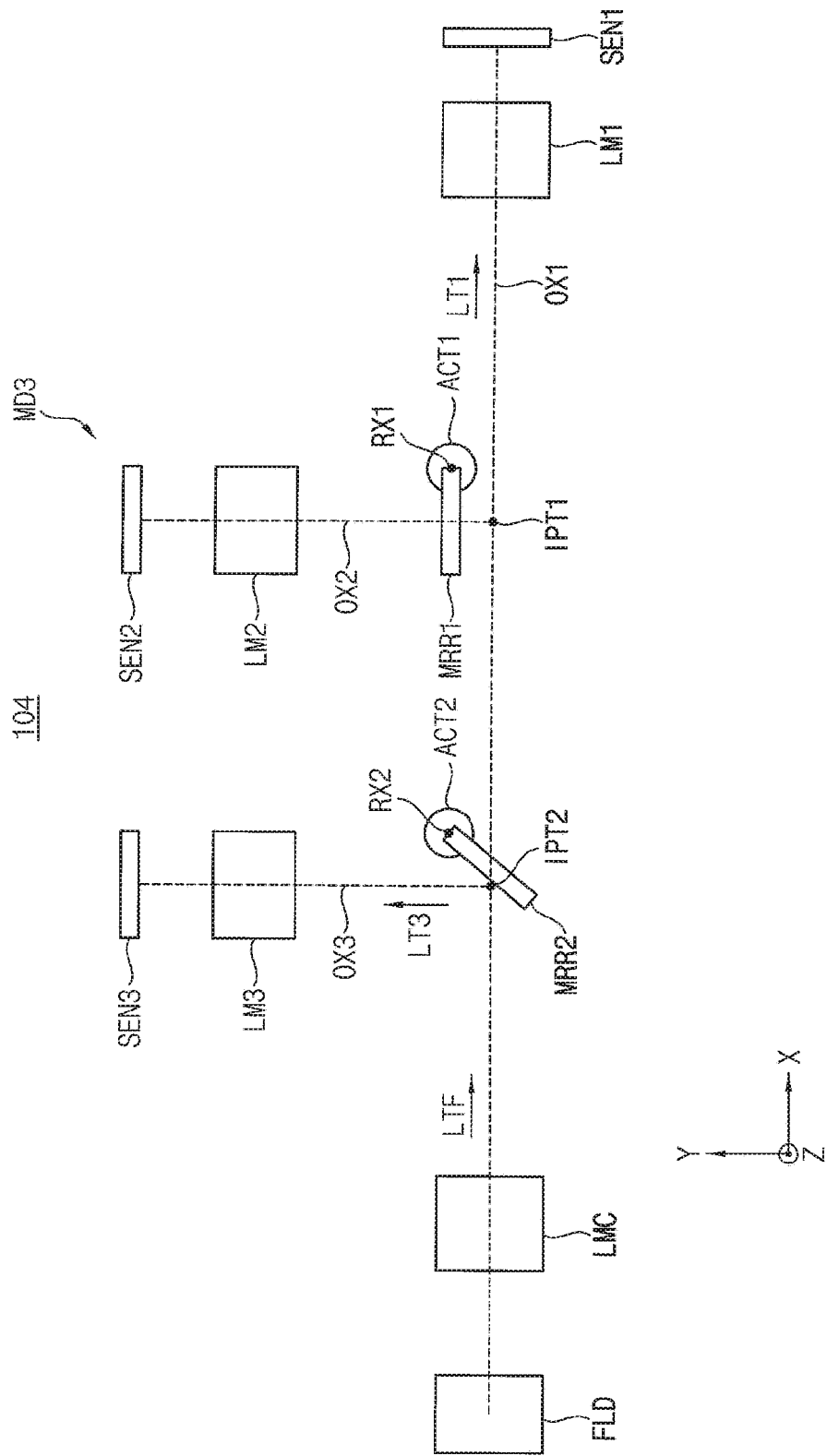

FIGS. 8 and 9 are diagrams illustrating a first operation mode MD1 of the light-folding camera 104 according to exemplary embodiments, FIGS. 10 and 11 are diagrams illustrating a second operation mode MD2 of the light-folding camera 104 according to exemplary embodiments, and FIGS. 12 and 13 are diagrams illustrating a third operation mode MD3 of the light-folding camera 104 according to exemplary embodiments. FIGS. 8, 10 and 12 are perspective views illustrating a disposition of the light-folding camera 104 in the respective operation modes, and FIGS. 9, 11 and 13 are top views illustrating the disposition of the light-folding camera 104 in the respective operation modes.

Referring to FIGS. 8 and 9, the first mirror MRR1 may be aligned to a first passing position and the second mirror MRR2 may be aligned to a second passing position in a first operation mode MD1 to pass the folded light LTF and output the first light LT1. The first passing position and the second passing position indicate positions in which the first mirror MRR1 and the second mirror MRR2 are aligned substantially in parallel to the XZ-plane, and in which the first mirror MRR1 and the second mirror MRR2 do not affect the propagation of the folded light LTF. For example, the first and second passing positions refer to positions in which the first and second mirrors MRR1 and MRR2, respectively, are placed outside of the path of the folded light LTF to allow the folded light LTF to pass by the first and second mirrors MRR1 and MRR2 without being reflected by the first and second mirrors MRR1 and MRR2. As a result, the folded light LTF, as output by the light folding device FLD without being further reflected, may be transferred as the first light LT1 to the first sensor SEN1.

Referring to FIGS. 10 and 11, the first mirror MRR1 may be aligned to a first reflecting position and the second mirror MRR2 may be aligned to the second passing position in a second operation mode MD2, so that the first mirror MRR1 may reflect the folded light LTF and output the second light LT2. The first reflecting position indicates a position in which a center portion of a reflecting surface of the first mirror MRR1 is aligned to the intermediate position IPT1 so as to reflect the folded light LTF. For example, the first reflecting position refers to a position in which the first mirror MRR1 is placed in the path of the folded light LTF to reflect the folded light LTF. As a result, the folded light LTF may be reflected and transferred as the second light LT2 to the second sensor SEN2.

Referring to FIGS. 12 and 13, the first mirror MRR1 may be aligned to the first passing position and the second mirror MRR2 may be aligned to a second reflecting position in a third operation mode MD3 so that the second mirror MRR2 may reflect the folded light LTF and output the third light LT3. The second reflecting position indicates a position in which a center portion of a reflecting surface of the second mirror MRR2 is aligned to the intermediate position IPT2 so as to reflect the folded light LTF. For example, the second reflecting position refers to a position in which the second mirror MRR2 is placed in the path of the folded light LTF to reflect the folded light LTF. As a result, the folded light LTF may be reflected and transferred as the third light LT3 to the third sensor SEN3.

Thus, in exemplary embodiments, the first mirror MRR1 may be aligned to the first passing position and the second mirror MRR2 may be aligned to the second passing position in the first operation mode MD1 (see FIGS. 8 and 9), the first mirror MRR1 may be aligned to the first reflecting position and the second mirror MRR2 may be aligned to the second passing position in the second operation mode MD2 (see FIGS. 10 and 11), and the first mirror MRR1 may be aligned to the first passing position and the second mirror MRR2 may be aligned to the second reflecting position in the third operation mode MD3 (see FIGS. 12 and 13), using the first actuator ACT1 and the second actuator ACT2 controlled to perform rotating operations to place the first and second mirrors MRR1 and MRR2 in the desired positions.

In exemplary embodiments, the first horizontal direction X and the second horizontal direction Y may be substantially perpendicular to each other. In this case, the first actuator ACT1 may be controlled such that the first passing position and the first reflecting position of the first mirror MRR1 may form a rotation angle of about 45 degrees, and the second actuator ACT2 may be controlled such that the second passing position and the second reflecting position of the second mirror MRR2 may form a rotation angle of about 45 degrees. For example, the folded light LTF may be incident on the reflecting surface of the first mirror MRR1 with an incident angle of about 45 degrees and a reflection angle of about 45 degrees when the first mirror MRR1 is aligned to the first reflecting position. In the same way, the folded light LTF may be incident on the reflecting surface of the second mirror MRR2 with an incident angle of about 45 degrees and a reflection angle of about 45 degrees when the second mirror MRR2 is aligned to the second reflecting position.

As such, the light-folding camera 104 according to exemplary embodiments may have a reduced size by sharing a portion of the light path by the first sensor SEN1, the second sensor SEN2 and the third sensor SEN3. Various image magnifications and functions may be efficiently implemented by integrating a plurality of cameras in the light-folding camera 104.

FIGS. 14 through 19 illustrate an exemplary embodiment in which the light path control device LPC in FIG. 1 is implemented with one mirror, and in which three sensors are integrated. In this exemplary embodiment, the light path control device LPC may selectively output one of a first light LT1, a second light LT2 and a third light LT3 according to operation modes.

Referring to FIGS. 14 through 19, a light-folding camera 105 may include a light folding device FLD, a mirror MRR, a first sensor SEN1, a second sensor SEN2, a third sensor SEN3, a common lens module LMC, a first lens module LM1, a second lens module LM2 and a third lens module LM3.

The light folding device FLD changes a light path of a vertical light LTV that is incident in a vertical direction Z to output a folded light LTF propagating in a first horizontal direction X substantially perpendicular to the vertical direction Z. The vertical light LTV may be provided through an aperture APT formed at a light blocking layer 10 such as, for example, a housing case of a mobile device. The light folding device FLD may be, for example, any optical device capable of changing a light path by about 90 degrees. In exemplary embodiments, the light folding device FLD may be implemented with, for example, a prism or a mirror.

The mirror MRR may be configured to rotate on a rotation axis RX substantially parallel to the vertical direction Z so that the mirror MRR may be aligned to different positions according to operation modes. For example, the mirror MRR may be mounted on an actuator ACT to perform a rotating operation based on an external control signal.

The first sensor SEN1 receives the first light LT1 propagating in the first horizontal direction X, and provides sensing data or image data corresponding to the first light LT1. The second sensor SEN2 receives the second light LT2 propagating in the second horizontal direction Y, and provides sensing data or image data corresponding to the second light LT2. The third sensor SEN3 receives the third light LT3 propagating in the second horizontal direction Y, and provides sensing data or image data corresponding to the third light LT3.

In exemplary embodiments, the first sensor SEN1, the second sensor SEN2 and the third sensor SEN3 may be implemented as various image sensors having different image magnifications. For example, the first sensor SEN1 may be a tele image sensor providing a tele image corresponding to a first field of view, the second sensor SEN2 may be a wide image sensor providing a wide image corresponding to a second field of view wider than the first field of view, and the third sensor SEN3 may be an ultra-wide image sensor providing an ultra-wide image corresponding to a third field of view wider than the second field of view.

In exemplary embodiments, the first sensor SEN1, the second sensor SEN2 and the third sensor SEN3 may be implemented as various sensors having different functions. For example, the first sensor SEN1 and the second sensor SEN2 may be image sensors having different image magnifications, and the third sensor SEN3 may be one of, for example, a luminance sensor, a dynamic vision sensor, a depth sensor adopting a time of flight (ToF) scheme, etc.

The common lens module LMC may be disposed between the light folding device FLD and the mirror MRR such that the common lens module LMC may have a first optical axis OX1 substantially parallel to the first horizontal direction X. For example, the first optical axis OX1 extends in the first horizontal direction X. The first lens module LM1 may be disposed between the mirror MRR and the first sensor SEN1 such that the first lens module LM1 may have the first optical axis OX1, which is the same as the optical axis of the common lens module LMC. For example, the first lens module LM1 and the common lens module LMC may share the same optical axis (e.g., the first optical axis OX1). The second lens module LM2 may be disposed between the mirror MRR and the second sensor SEN2 such that the second lens module LM2 may have a second optical axis OX2 that intersects with the first optical axis OX1 at an intermediate position IPT1 on the first optical axis OX1. The second optical axis OX2 is substantially perpendicular to the first optical axis OX1. The third lens module LM3 may be disposed between the mirror MRR and the third sensor SEN3 such that the third lens module LM3 may have a third optical axis OX3 that intersects with the first optical axis OX1 at an intermediate position IPT2 on the first optical axis OX1. The third optical axis OX3 is substantially perpendicular to the first optical axis OX1.

Each of the common lens module LMC, the first lens module LM1, the second lens module LM2 and the third lens module LM3 may be implemented with a single lens or a combination of two or more lens.

Figure 14:
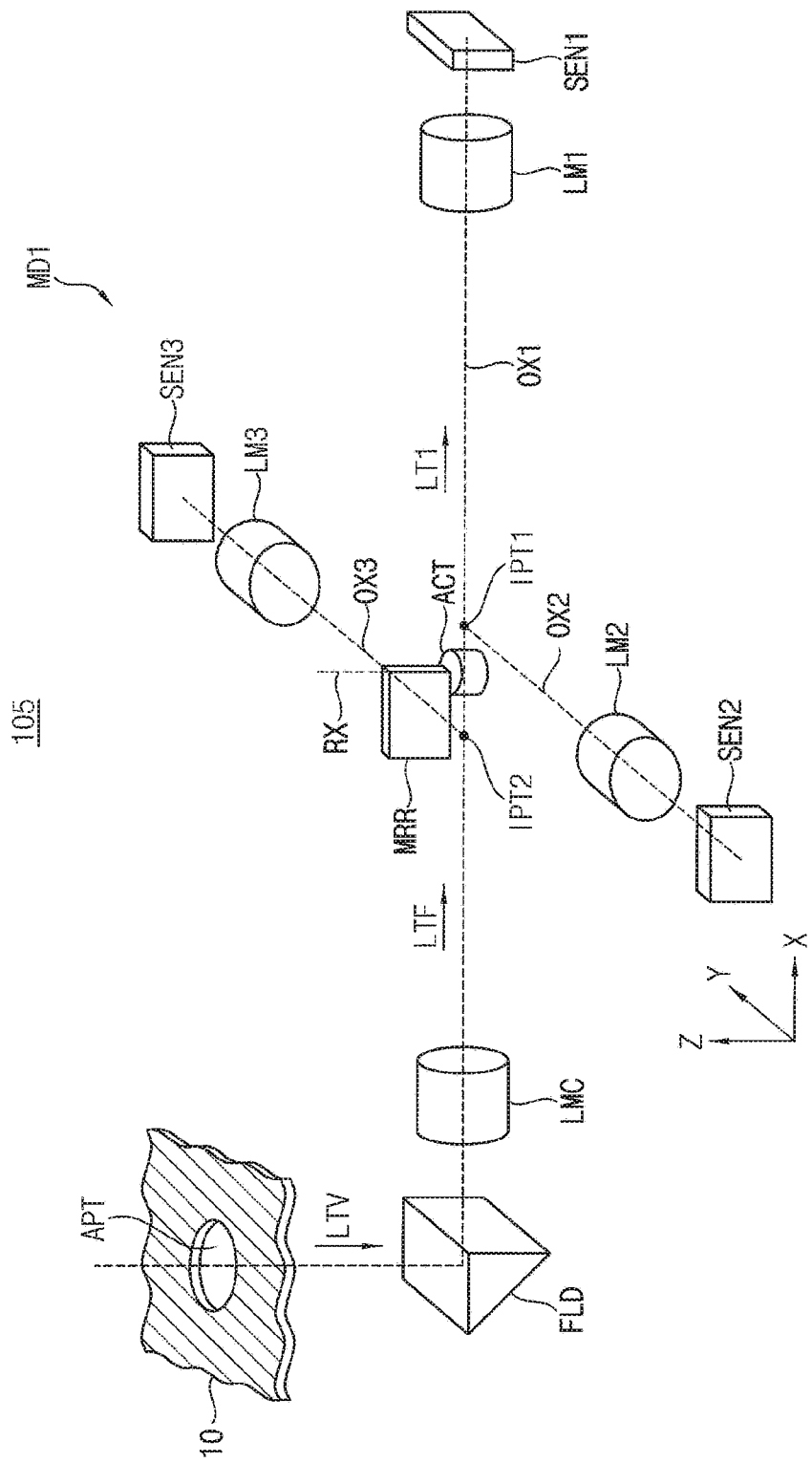
FIGS. 14 and 15 are diagrams illustrating a first operation mode of a light-folding camera according to exemplary embodiments.
Figure 15:
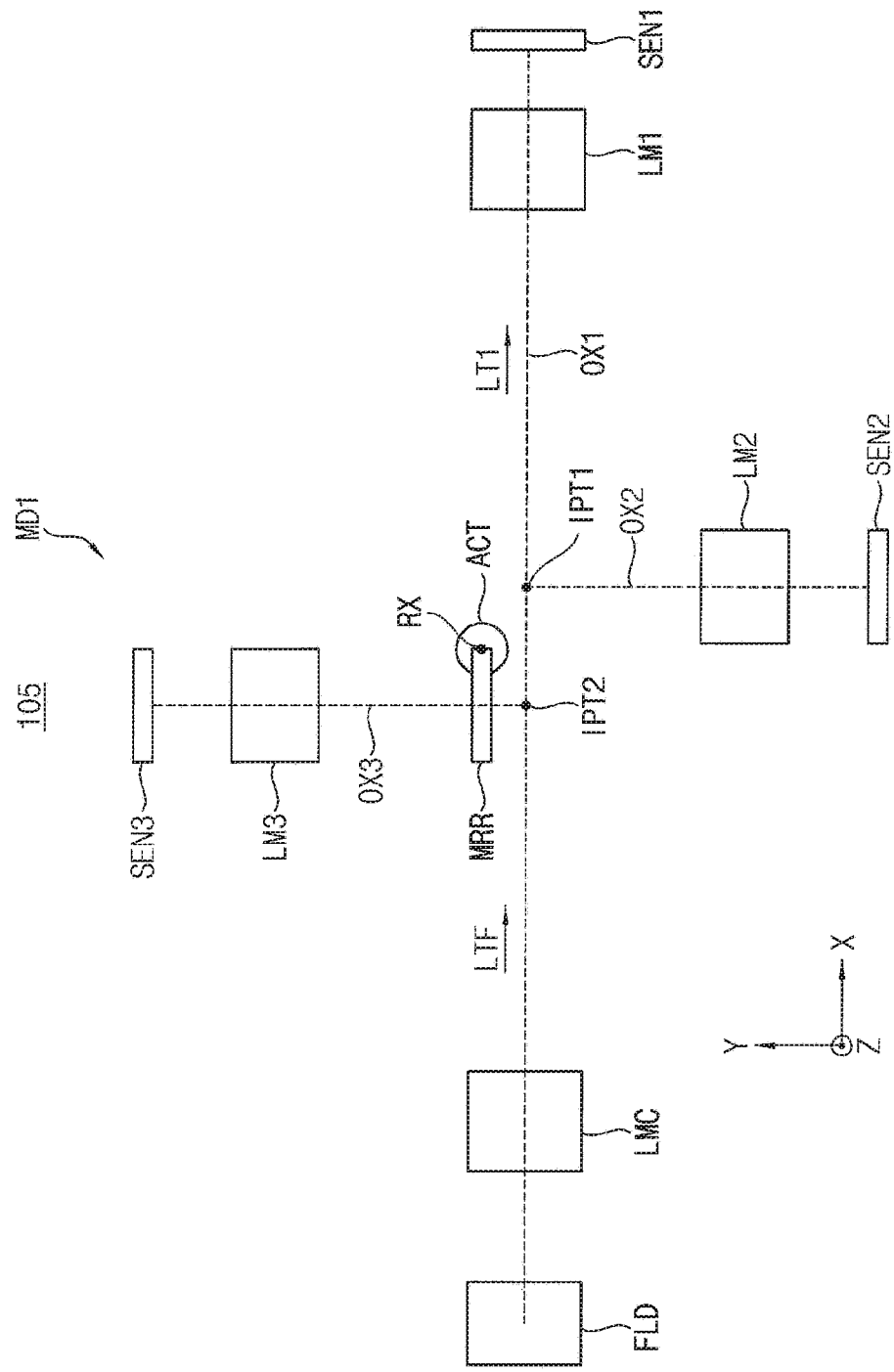
Figure 16:
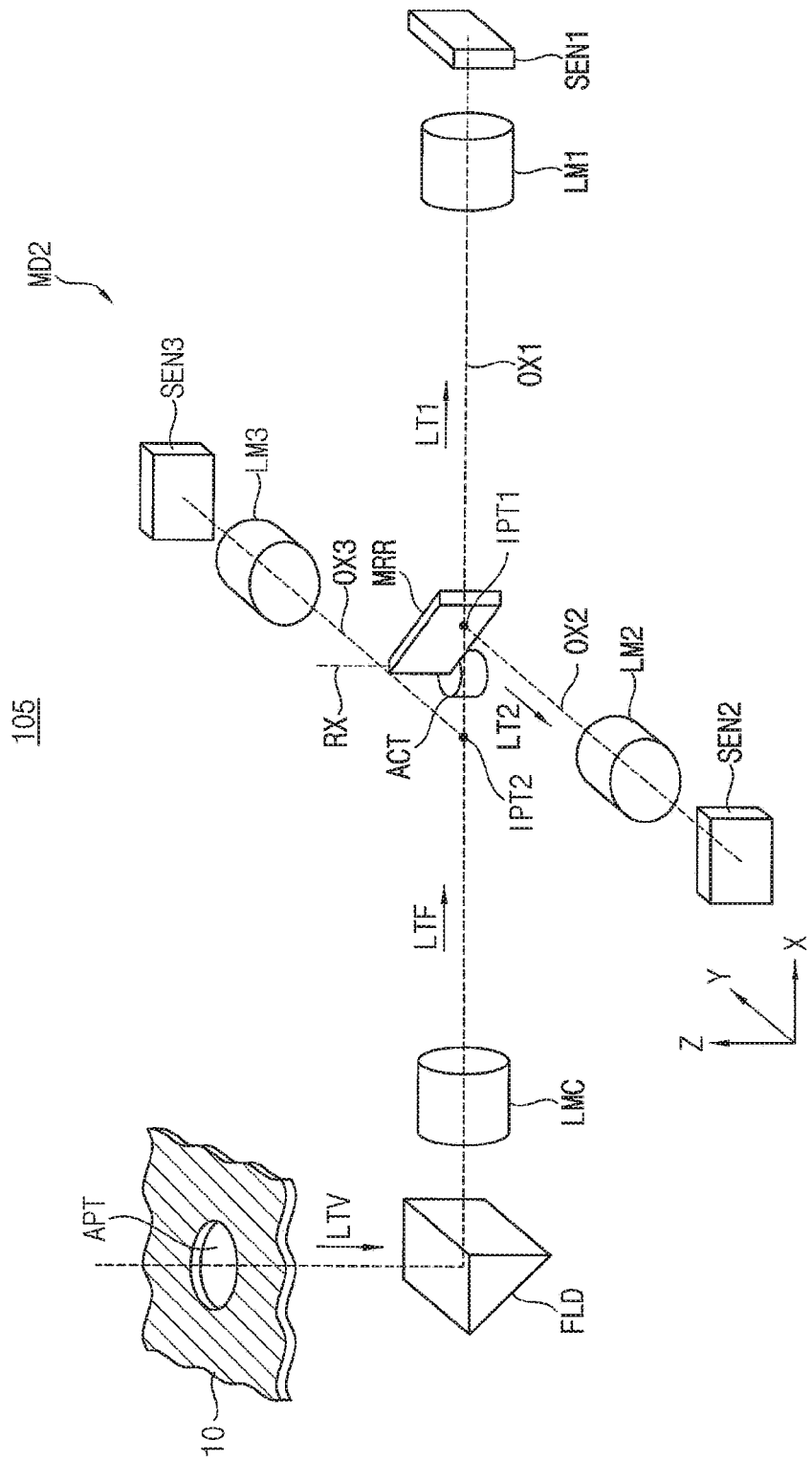
FIGS. 16 and 17 are diagrams illustrating a second operation mode of a light-folding camera according to exemplary embodiments.
Figure 17:
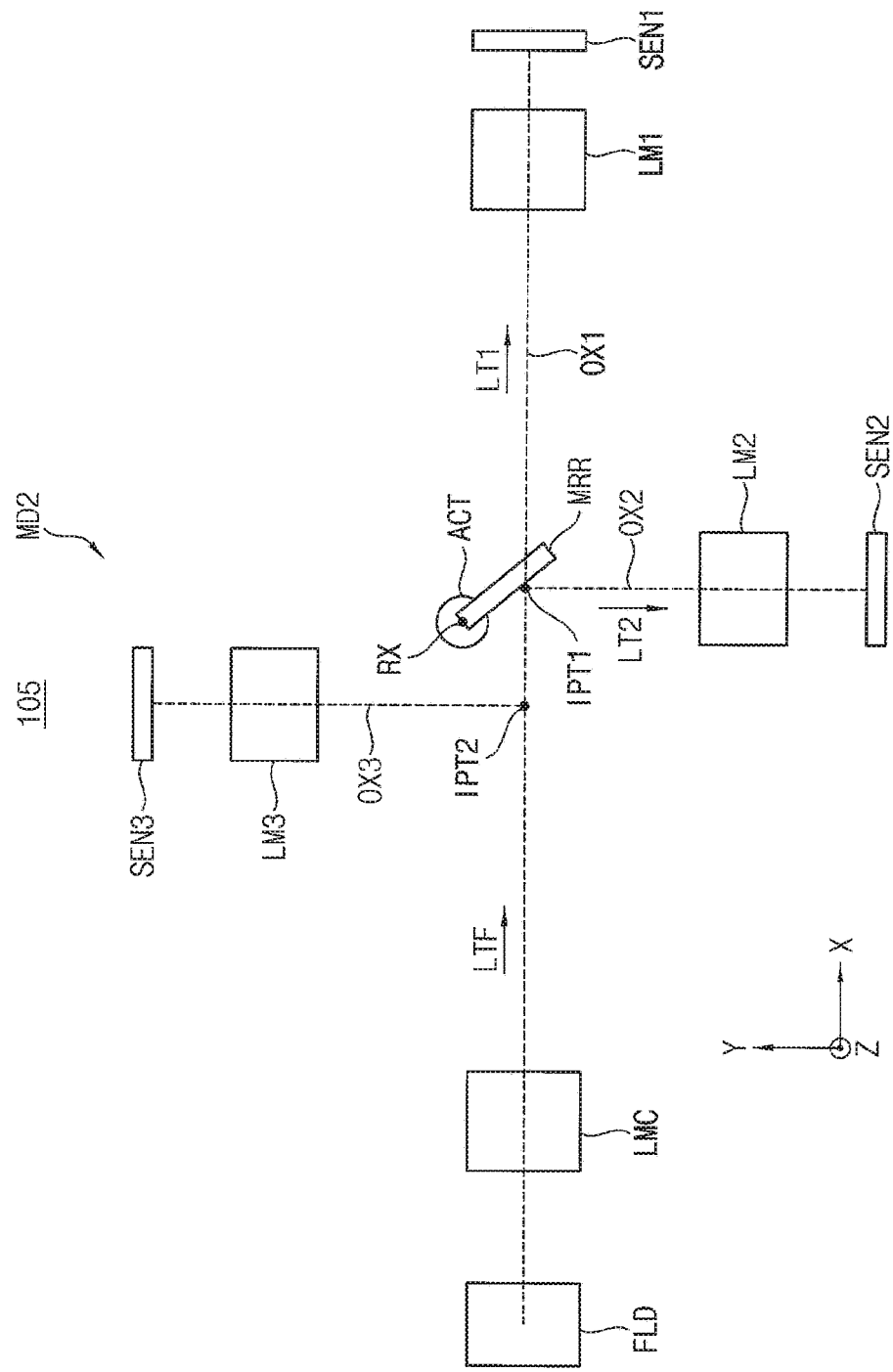
Figure 18:
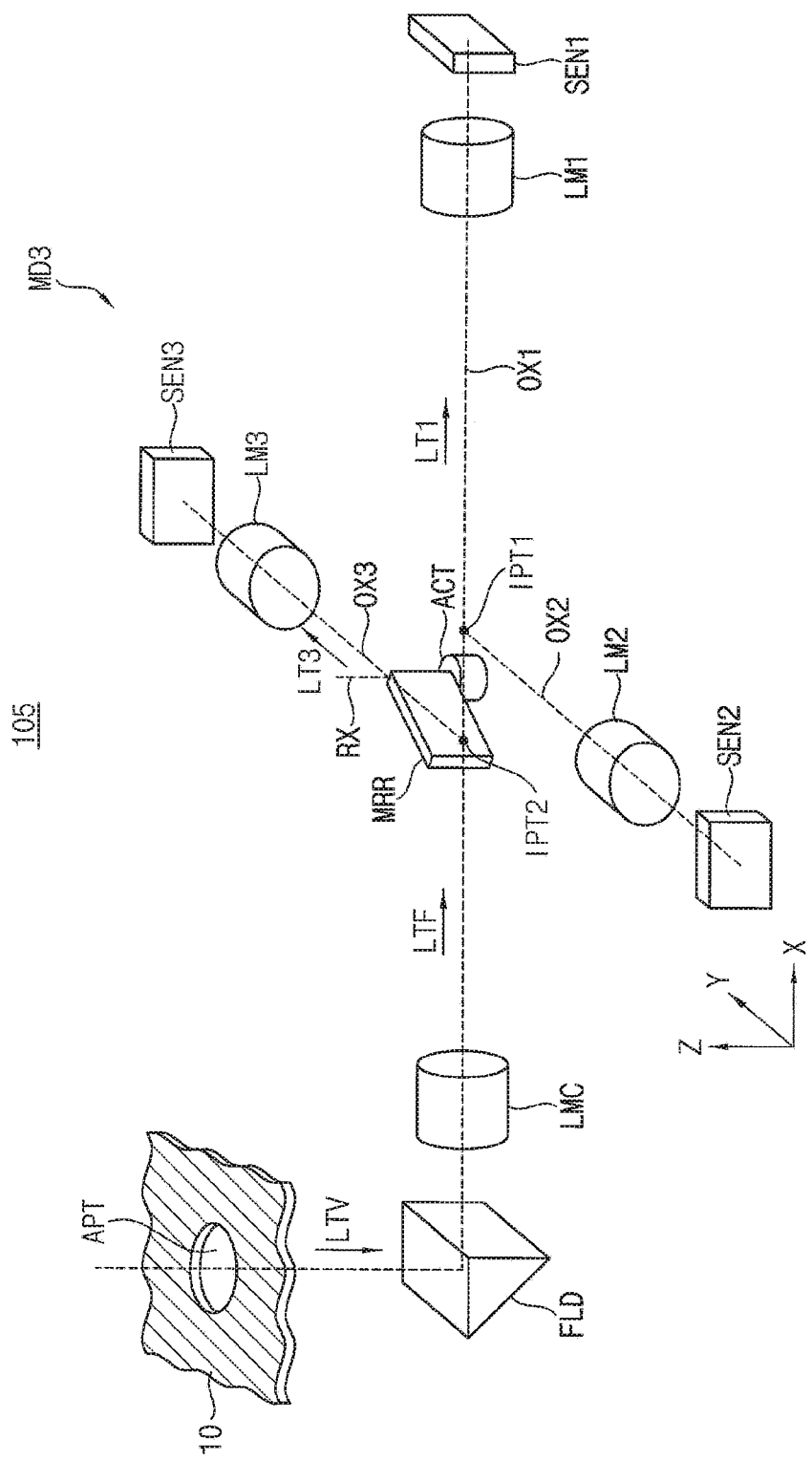
FIGS. 18 and 19 are diagrams illustrating a third operation mode of a light-folding camera according to exemplary embodiments.
Figure 19:
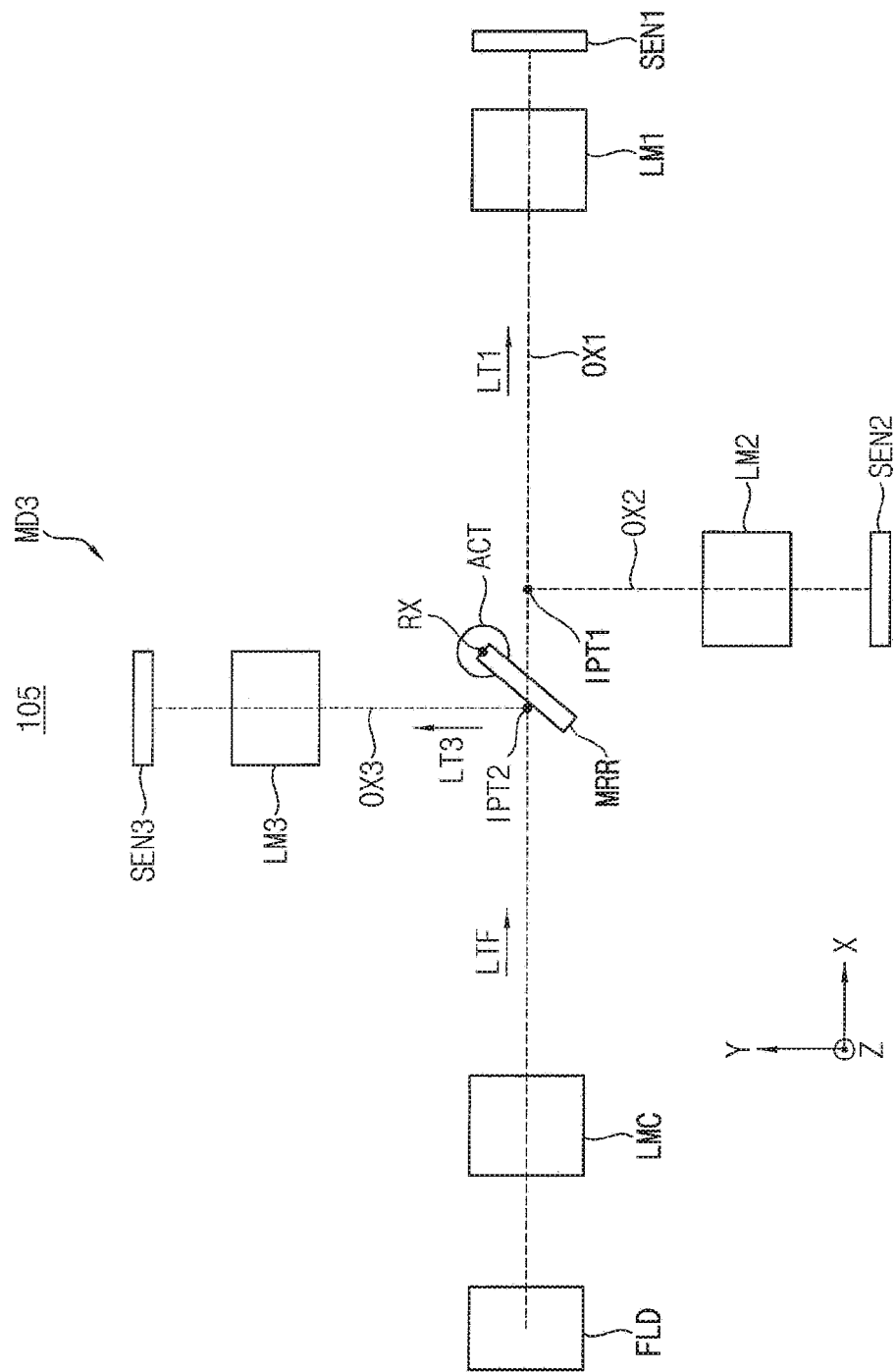

FIGS. 14 and 15 are diagrams illustrating a first operation mode MD1 of a light-folding camera 105 according to exemplary embodiments, FIGS. 16 and 17 are diagrams illustrating a second operation mode MD2 of the light-folding camera 105 according to exemplary embodiments, and FIGS. 18 and 19 are diagrams illustrating a third operation mode MD3 of the light-folding camera 105 according to exemplary embodiments. FIGS. 14, 16 and 18 are perspective views illustrating a disposition of the light-folding camera 105 in the respective operation modes, and FIGS. 15, 17 and 19 are top views illustrating the disposition of the light-folding camera 105 in the respective operation modes.

Referring to FIGS. 8 through 13, in an exemplary embodiment, the second sensor SEN2 and the third sensor SEN3 are disposed on the same side of the first optical axis OX1 in the light-folding camera 104. In contrast, referring to FIGS. 14 through 19, in an exemplary embodiment, the second sensor SEN2 and the third sensor SEN3 are disposed on opposite sides of the first optical axis OX1 in the light-folding camera 105.

Referring to FIGS. 14 and 15, the mirror MRR may be aligned to a passing position in a first operation mode MD1 to pass the folded light LTF and output the first light LT1. The passing position indicates a position in which the mirror MRR is aligned substantially parallel to the XZ-plane, and in which the mirror MRR does not affect the propagation of the folded light LTF. For example, the passing position refers to a position in which the mirror MRR is placed outside of the path of the folded light LTF to allow the folded light LTF to pass by the mirror MRR without being reflected by the mirror MRR. As a result, the folded light LTF, as output by the light folding device FLD without being further reflected, may be transferred as the first light LT1 to the first sensor SEN1.

Referring to FIGS. 16 and 17, the mirror MRR may be aligned to a first reflecting position in a second operation mode MD2 to reflect the folded light LTF and output the second light LT2. The first reflecting position indicates a position in which a center portion of a reflecting surface of the mirror MRR is aligned to the intermediate position IPT1 so as to reflect the folded light LTF. For example, the first reflecting position refers to a position in which the mirror MRR is placed in the path of the folded light LTF to reflect the folded light LTF. As a result, the folded light LTF may be reflected and transferred as the second light LT2 to the second sensor SEN2.

Referring to FIGS. 18 and 19, the mirror MRR may be aligned to a second reflecting position to reflect the folded light LTF and output the third light LT3. The second reflecting position indicates a position in which the center portion of a reflecting surface of the mirror MRR is aligned to the intermediate position IPT2 so as to reflect the folded light LTF. For example, the second reflecting position refers to a position in which the mirror MRR is placed in the path of the folded light LTF to reflect the folded light LTF. As a result, the folded light LTF may be reflected and transferred as the third light LT3 to the third sensor SEN3.

Thus, in exemplary embodiments, the mirror MRR may be aligned to the passing position in the first operation mode MD1 (see FIGS. 14 and 15), to the first reflecting position in the second operation mode MD2 (see FIGS. 16 and 17), and to the second reflecting position in the third operation mode MD3 (see FIGS. 18 and 19), using the actuator ACT controlled to perform rotating operations.

In exemplary embodiments, the first horizontal direction X and the second horizontal direction Y may be substantially perpendicular to each other. In this case, the actuator ACT may be controlled such that the passing position and the first reflecting position of the mirror MRR may form a rotation angle of about 135 degrees, the passing position and the second reflecting position of the mirror MRR may form a rotation angle of about 45 degrees, and the first reflecting position and the second reflecting position of the mirror MRR may form a rotation angle of about 90 degrees. For example, the folded light LTF may be incident on the reflecting surface of the mirror MRR with an incident angle of about 45 degrees and a reflection angle of about 45 degrees when the mirror MRR is aligned to the first reflecting position. In the same way, the folded light LTF may be incident on the reflecting surface of the mirror MRR with an incident angle of about 45 degrees and a reflection angle of about 45 degrees when the mirror MRR is aligned to the second reflecting position.

As such, the light-folding camera 105 according to exemplary embodiments may have a reduced size by sharing a portion of the light path by the first sensor SEN1, the second sensor SEN2 and the third sensor SEN3. Various image magnifications and functions may be efficiently implemented by integrating a plurality of cameras in the light-folding camera 105.

Figure 20:
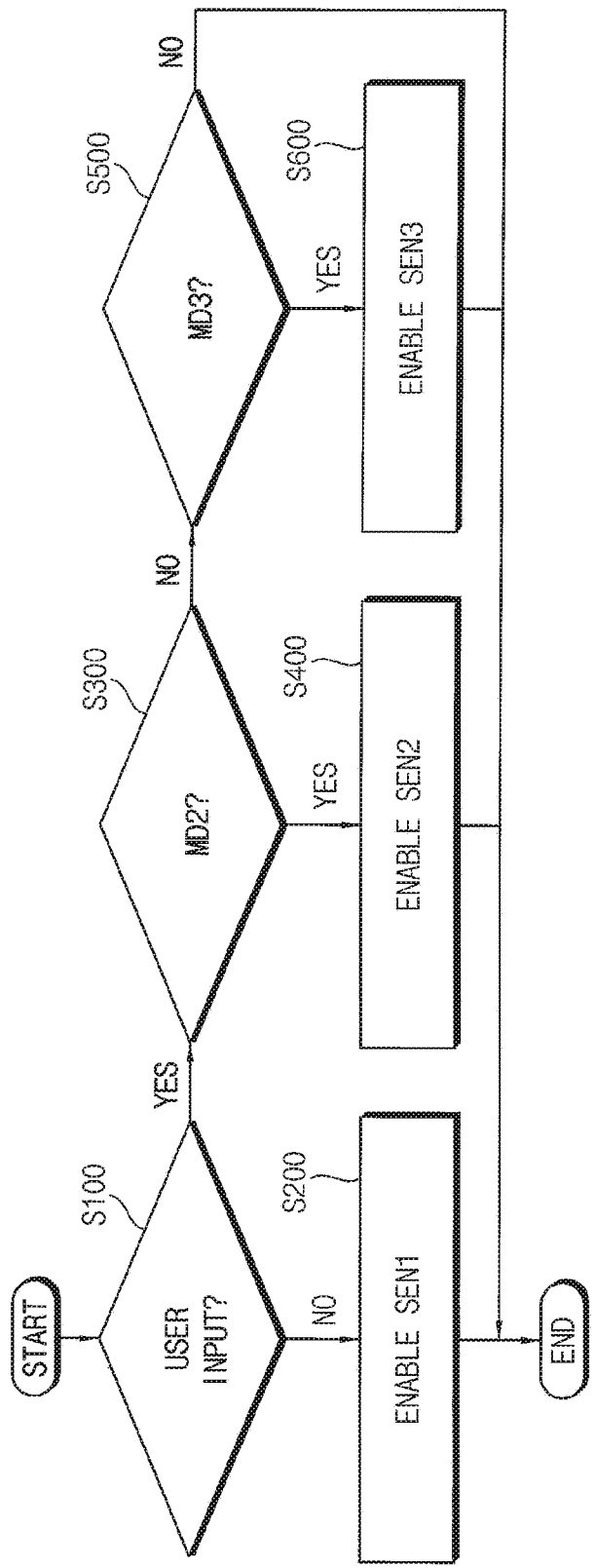
FIG. 20 is a flowchart illustrating a method of controlling a light-folding camera according to exemplary embodiments.

FIG. 20 is a flowchart illustrating a method of controlling a light-folding camera according to exemplary embodiments.

Referring to FIG. 20, a camera controller, which will be described below with reference to FIG. 26, may perform a monitoring operation to determine whether there is a user input (S100). The user input may be provided by a user, for example, to change an image magnification or a zoom factor to be different from a default value.

When there is no user input (S100: NO), the camera controller may enable the first sensor SEN1 as a default (S200). For example, the camera controller may control at least one actuator so that at least one mirror may be aligned as described with reference to FIGS. 8, 9, 14 and 15, and the light-folding camera may operate in the first operation mode MD1.

When there is a user input (S100: YES), the camera controller may determine whether the user input corresponds to the second operation mode MD2 (S300). When the user input corresponds to the second operation mode MD2 (S300: YES), the camera controller disables the presently enabled sensor and enables the second sensor SEN2 (S400). For example, the camera controller may control at least one actuator so that at least one mirror may be aligned as described with reference to FIGS. 10, 11, 16 and 17, and the light-folding camera may operate in the second operation mode MD2.

When the user input does not correspond to the second operation mode MD2 (S300: NO), the camera controller may determine whether the user input corresponds to the third operation mode MD3 (S500). When the user input corresponds to the third operation mode MD3 (S500: YES), the camera controller disables the presently enabled sensor and enables the third sensor SEN3 (S600). For example, the camera controller may control at least one actuator so that at least one mirror may be aligned as described with reference to FIGS. 12, 13, 18 and 19, and the light-folding camera may operate in the third operation mode MD3.

As such, one of the first sensor SEN1, the second sensor SEN2 and the third sensor SEN3 may be enabled selectively, and an image corresponding to the image magnification requested by the user may be captured and provided.

Figure 21:
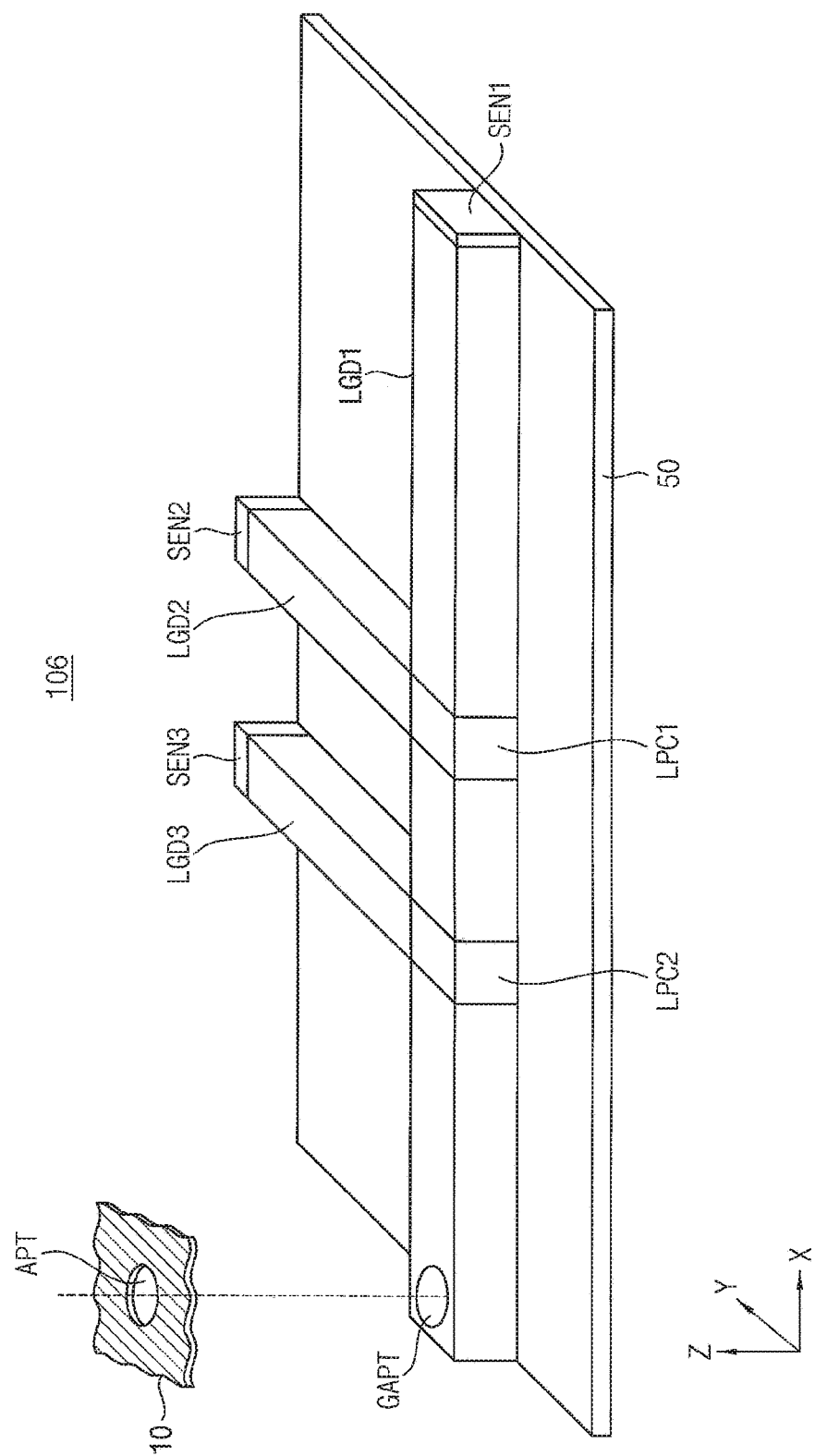
FIG. 21 is a diagram illustrating a perspective view of a light-folding camera according to exemplary embodiments.

FIG. 21 is a diagram illustrating a perspective view of a light-folding camera according to exemplary embodiments.

Referring to FIG. 21, a light-folding camera 106 may be implemented in the form of a module using a base substrate 50. Light guides LGD1, LGD2 and LGD3 may be formed on the base substrate 50 to implement the light-folding camera 106.

FIG. 21 illustrates light path control devices LPC1 and LPC2, and sensors SEN1, SEN2 and SEN3 for convenience of illustration. It will be understood that a light folding device and lens modules as described above may be disposed inside the light guides LGD1, LGD2 and LGD3. The vertical light LTV may be incident through the apertures APT and GAPT.

The light guides LGD1, LGD2 and LGD3 may be formed with materials for blocking noise such as, for example, unintended external lights. In addition, anti-reflection coating films may be formed on inner surface of the light guides LGD1, LGD2 and LGD3 to reduce noise such as, for example, unintended internal lights.

Figure 22:
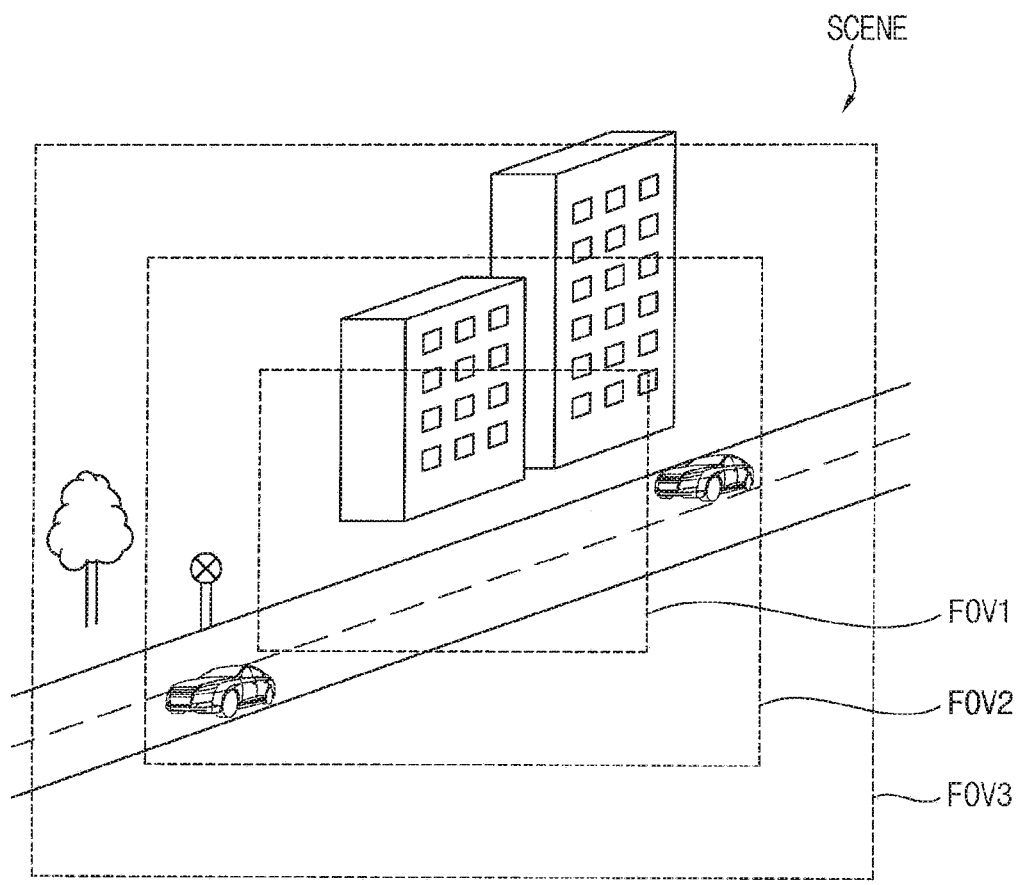
FIG. 22 is a diagram illustrating an example of a scene.
Figure 23:
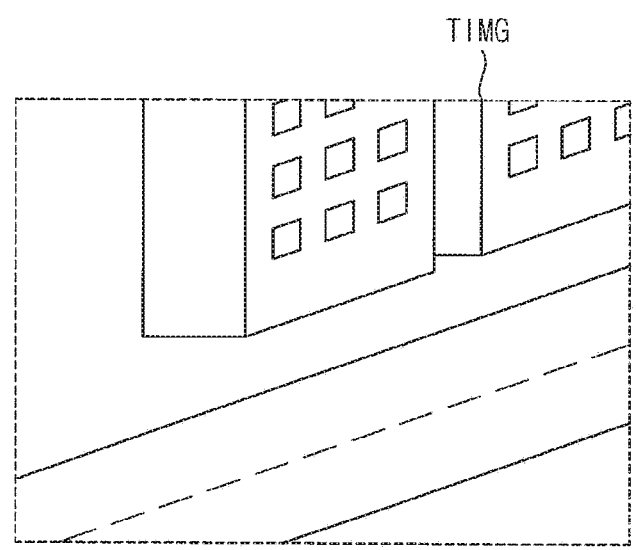
FIG. 23 is a diagram illustrating a tele image provided by capturing the scene of FIG. 22.
Figure 24:
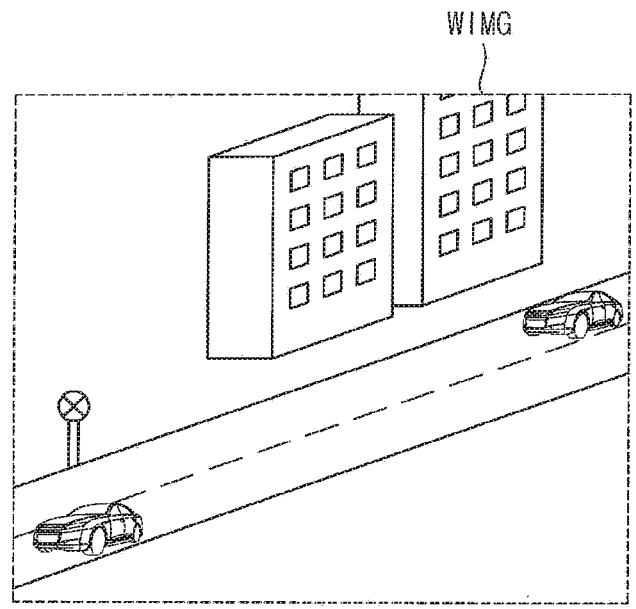
FIG. 24 is a diagram illustrating a wide image provided by capturing the scene of FIG. 22.
Figure 25:
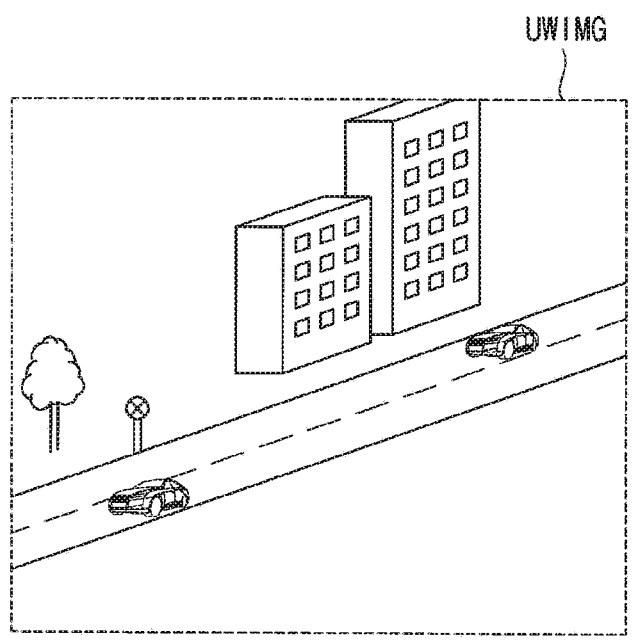
FIG. 25 is a diagram illustrating an ultra-wide image provided by capturing the scene of FIG. 22.

FIG. 22 is a diagram illustrating an example of a scene. FIG. 23 is a diagram illustrating a tele image provided by capturing the scene of FIG. 22. FIG. 24 is a diagram illustrating a wide image provided by capturing the scene of FIG. 22. FIG. 25 is a diagram illustrating an ultra-wide image provided by capturing the scene of FIG. 22.

In the exemplary embodiments as described with reference to FIGS. 8 through 19, the first sensor SEN1 may be a tele image sensor, the second sensor SEN2 may be a wide image sensor and the third sensor SEN3 may be an ultra-wide image sensor.

Referring to FIGS. 22 through 25, the first sensor SEN1 corresponding to the tele image sensor may provide a tele image TIMG corresponding to a first field of view FOV1, the second sensor SEN2 corresponding to the wide image sensor may provide a wide image WIMG corresponding to a second field of view FOV2 wider than the first field of view FOV1, and the third sensor SEN3 corresponding to the ultra-wide image sensor may provide an ultra-wide image UWIMG corresponding to a third field of view FOV3 wider than the second field of view FOV2.

In general, the wide image WIMG may have a lower resolution than the tele image TIMG, and the ultra-wide image UWIMG may have a lower resolution than the wide image WIMG. A fusion image corresponding to an intermediate field of view may be provided by interpolating or fusing the images TIMG, WIMG and UWIMG of the different field of views and resolutions.

Figure 26:
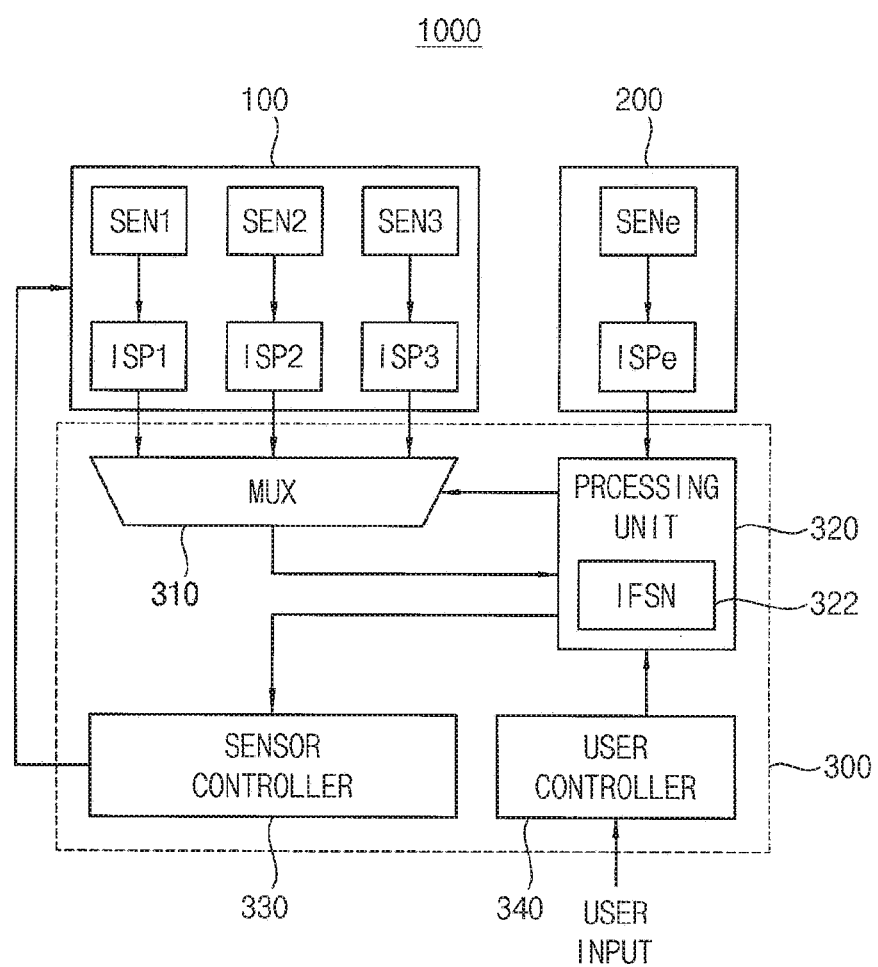
FIG. 26 is a block diagram illustrating a system including a light-folding camera according to exemplary embodiments.

FIG. 26 is a block diagram illustrating a system including a light-folding camera according to exemplary embodiments.

Referring to FIG. 26, a system 1000 may include a light-folding camera 100 according to exemplary embodiments and a camera controller 300 configured to control the light-folding camera 100. In exemplary embodiments, the system 1000 may further include an extra camera 200 as described above.

The light-folding camera 100 may include a first sensor SEN1, a second sensor SEN2, a third sensor SEN3, a first image signal processor ISP1, a second image signal processor ISP2 and a third image signal processor ISP3. The first image signal processor ISP1, the second image signal processor ISP2 and the third image signal processor ISP3 may process image signals or image data provided from the first sensor SEN1, the second sensor SEN2 and the third sensor SEN3, respectively. Although FIG. 26 illustrates that the first image signal processor ISP1, the second image signal processor ISP2 and the third image signal processor ISP3 are included inside of the light-folding camera 100, exemplary embodiments are not limited thereto. For example, in exemplary embodiments, the processors ISP1, ISP2 and ISP3 may be implemented outside of the light-folding camera 100. For example, the processors ISP1, ISP2 and ISP3 may be included in the camera controller 300. The light folding device FLD, the light path control device LPC and the lens modules LMC, LM1, LM2 and LM3 as described above are omitted in FIG. 26 for convenience of illustration.

The extra camera 200 may include an extra sensor SENe and an extra image signal processor ISPe configured to process a signal provided from the extra sensor SENe.

The camera controller 300 may include a multiplexer MUX 310, a processing unit 320, a sensor controller 330 and a user controller 340.

The sensor controller 330 may control an operation of the light-folding camera 100 under control of the processing unit 320. For example, the sensor controller 330 may provide control signals to drive the above-described actuators. In addition, the sensor controller 330 may control an operation of the extra camera 200.

The processing unit 320 may determine which sensor is enabled based on a signal from the sensor controller 330.

The user controller 340 may control a user input. The user input may include, for example, information related to an operation mode control, a region of interest ROI in the captured image, a zoom function, etc. The ROI may be designated by a user, and is a portion of the captured image on which the focus of the sensors is concentrated. The zoom factor may be input by the user to determine the image magnification of the image to be stored or displayed.

The processing unit 320 may include an image fusion unit IFSN 322 configured to perform an image fusion operation, as will be described below with reference to FIGS. 27, 28 and 29. The image fusion unit IFSN 322 may interpolate or fuse at least two image data provided from at least two of the sensors SEN1, SEN2 and SEN3 to provide a fusion image data.

Figure 27:
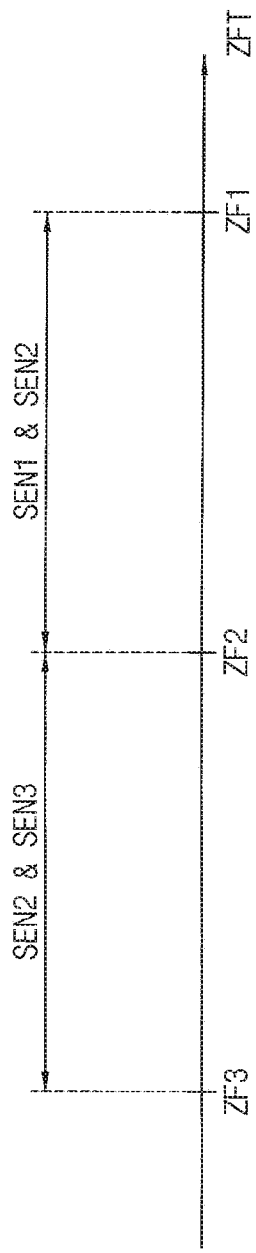
FIGS. 27, 28 and 29 are diagrams illustrating an image fusion operation of a light-folding camera according to exemplary embodiments.
Figure 28:
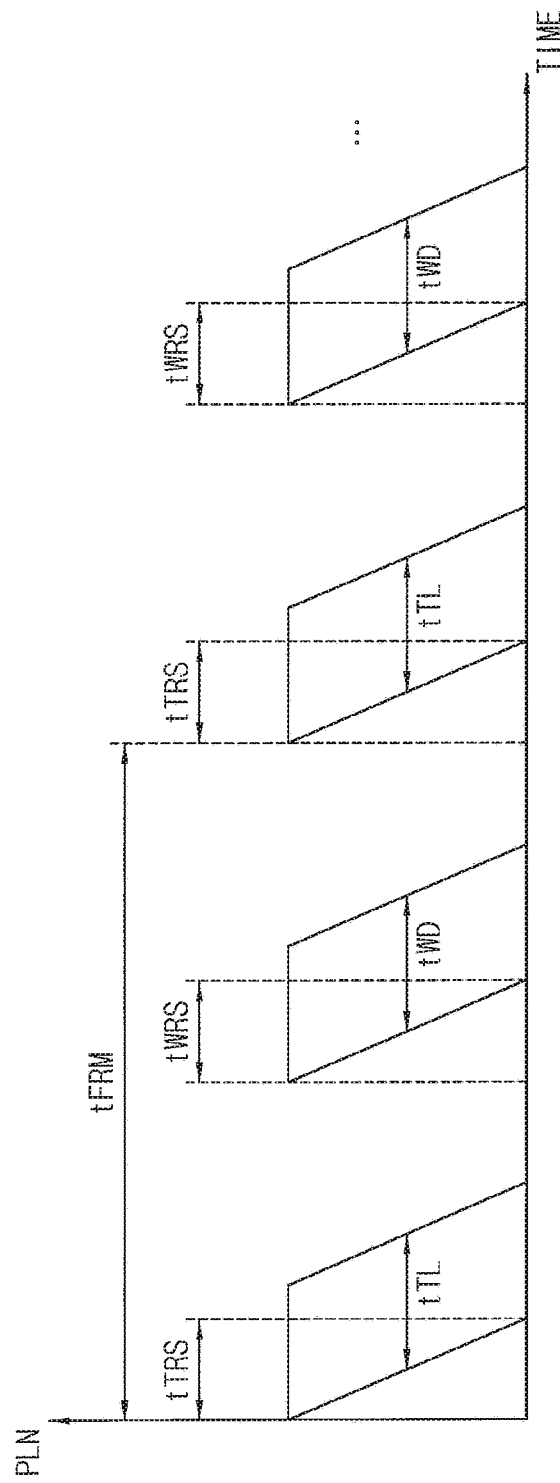
Figure 29:
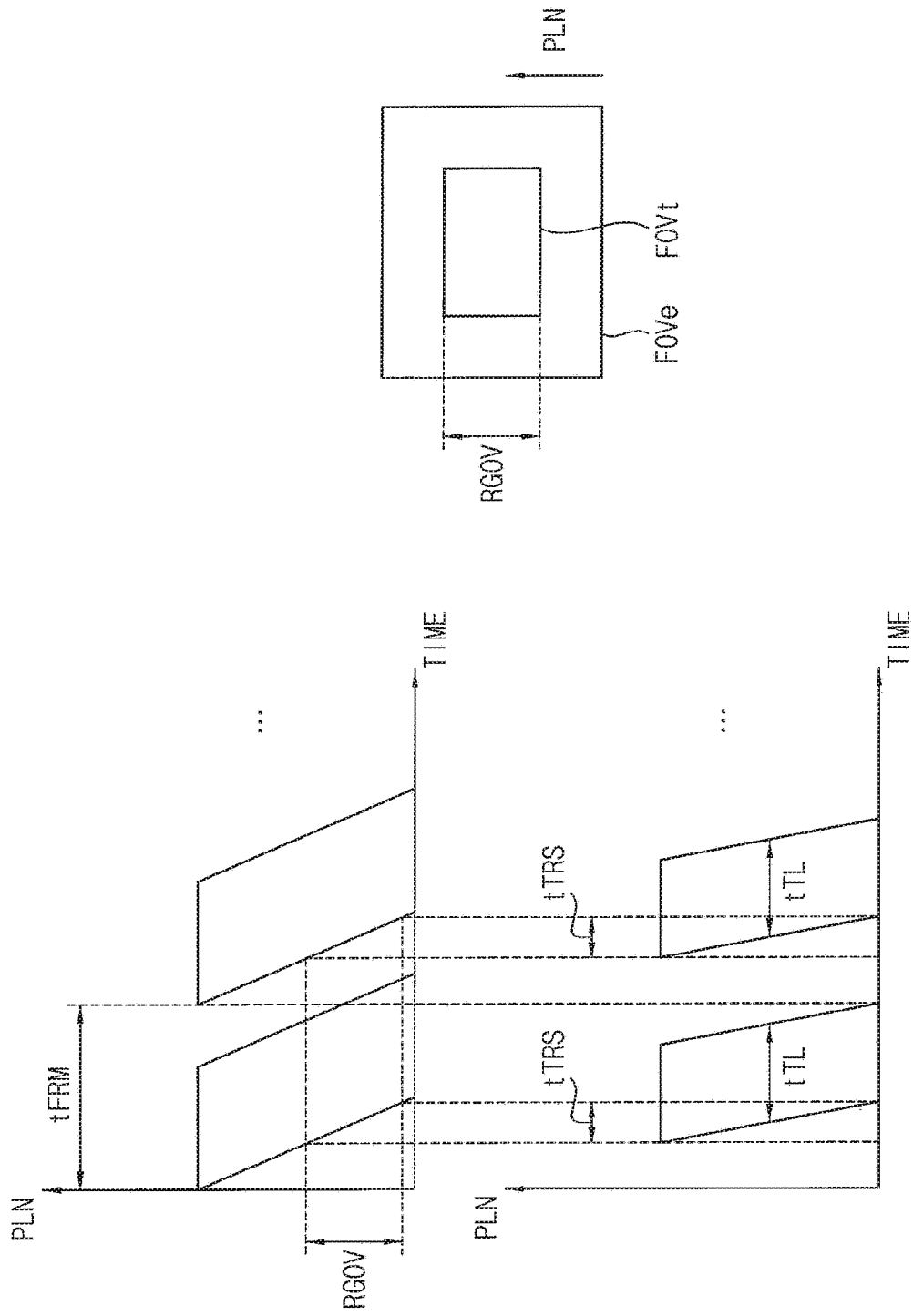

FIGS. 27, 28 and 29 are diagrams illustrating an image fusion operation of a light-folding camera according to exemplary embodiments.

As described above, the first sensor SEN1, the second sensor SEN2 and the third sensor SEN3 included in the light-folding camera according to exemplary embodiments may have respective focal distances which are determined by the fixed positions of the sensors and the lens modules. The sensors having the fixed focal distances may provide more stable image data in comparison with a camera adopting the optical zoom scheme that moves the lens module so as to change the image magnification or the zoom factor. Because the first sensor SEN1, the second sensor SEN2 and the third sensor SEN3 have fixed focal distances, the first sensor SEN1, the second sensor SEN2 and the third sensor SEN3 may have fixed image magnifications or fixed zoom factors.

In exemplary embodiments, the first sensor SEN1, the second sensor SEN2 and the third sensor SEN3 may be implemented as various image sensors having different image magnifications. For example, the first sensor SEN1 may be a tele image sensor providing a tele image corresponding to a first field of view (FOV), the second sensor SEN2 may be a wide image sensor providing a wide image corresponding to a second field of view wider than the first field of view, and the third sensor SEN3 may be an ultra-wide image sensor providing an ultra-wide image corresponding to a third field of view wider than the second field of view.

For example, the first sensor SEN1 may have a first zoom factor ZF1, the second sensor SEN2 may have a second zoom factor ZF2 smaller than the first zoom factor ZF1, and the third sensor SEN3 may have a third zoom factor ZF3 smaller than the second zoom factor ZF2.

In FIG. 27, the horizontal axis indicates a target zoom factor ZFT requested or input by a user. As illustrated in FIG. 27, the image fusion operation may be performed using the first sensor SEN1 and the second sensor SEN2 when the target zoom factor ZFT is between the first zoom factor ZF1 and the second zoom factor ZF2. Also, the image fusion operation may be performed using the second sensor SEN2 and the third sensor SEN3 when the target zoom factor ZFT is between the second zoom factor ZF2 and the third zoom factor ZF3.

In FIGS. 28 and 29, the horizontal axis indicates an elapsed time (TIME) and the vertical axis indicates an index number of pixel lines (PLN) included in respective image sensors. It is assumed that the image sensors have the same number of pixel lines in FIGS. 28 and 29. However, the image sensors may have a different number of pixel lines if the image sensors have different resolutions.

FIG. 28 illustrates an example in which the first sensor SEN1 corresponding to the tele image sensor and the second image sensor SEN2 corresponding to the wide image sensor are enabled alternately to obtain a tele image corresponding to the first zoom factor ZF1 and a wide image corresponding to the second zoom factor ZF2. In FIG. 28, tTRS and tTL indicate a rolling shutter time and an exposure time of the tele image sensor, and tWRS and tWD indicate a rolling shutter time and an exposure time of the wide image sensor. tFRM indicates one frame period.

As such, the image fusion unit IFSN 322 in FIG. 26 may provide a fusion image corresponding to the target zoom factor ZFT between the first zoom factor ZF1 and the second zoom factor ZF2 by fusing the tele image corresponding to the first zoom factor ZF1 and the wide image corresponding to the second zoom factor ZF2, which are provided alternately.

FIG. 29 illustrates an example in which the first sensor SEN1 corresponding to the tele image sensor and the extra camera EXCAM are enabled simultaneously to obtain a tele image corresponding to the first zoom factor ZF1 and an extra image corresponding to the extra zoom factor. In FIG. 29, tTRS and tTL indicate a rolling shutter time and an exposure time of the tele image sensor. tFRM indicates one frame period. RGOV indicates an overlapping region of the tele image and the extra image, that is, the overlapping region of the tele field of view FOVt and the extra field of view FOVe.

As such, the image fusion unit IFSN 322 in FIG. 26 may provide a fusion image corresponding to the target zoom factor ZFT between the first zoom factor ZF1 and the extra zoom factor by fusing the tele image corresponding to the first zoom factor ZF1 and the extra image corresponding to the extra zoom factor, which are provided substantially at the same time.

Figure 30:
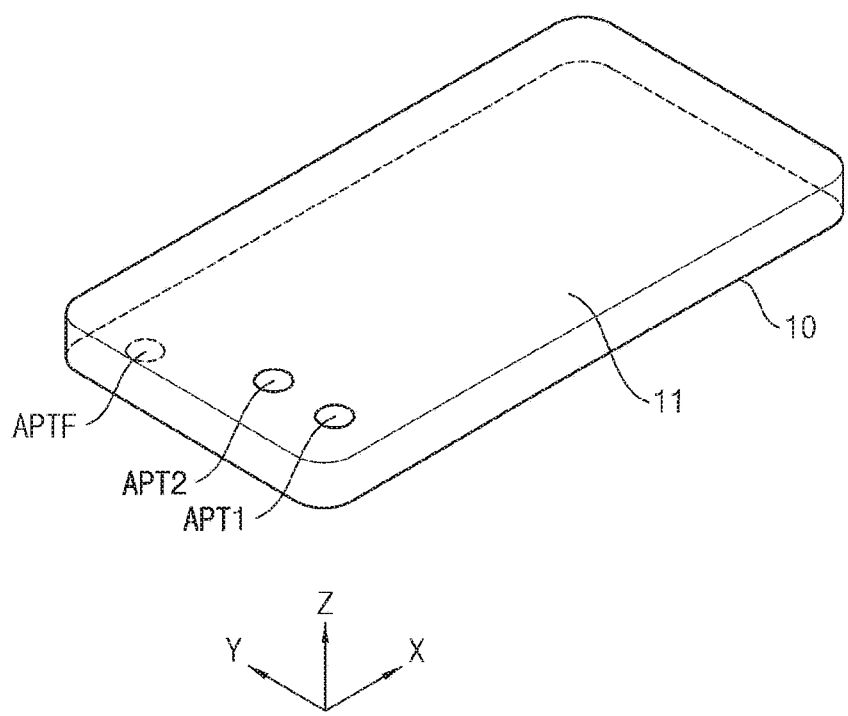
FIG. 30 is a diagram illustrating a perspective view of a mobile device including a light-folding camera according to exemplary embodiments.

FIG. 30 is a diagram illustrating a perspective view of a mobile device including a light-folding camera according to exemplary embodiments. FIG. 31 is a diagram illustrating an exemplary embodiment of a layout of the mobile device of FIG. 30.

Referring to FIGS. 30 and 31, a mobile device 2000 such as, for example, a smartphone, may include a housing case 10, a main board 2010 mounted in the housing case 10, a light-folding camera 100 mounted in the housing case 10 and electrically connected to the main board 2010 through a connector 2020, a front camera FRCAM, a battery 2030, etc. Various components such as, for example, a system on chip (SOC) may be integrated on the main board 2010. The above-described camera controller configured to control the light-folding camera 100 and process data provided from the light-folding camera 100 may be included in the system on chip (SOC) or implemented as a distinct chip to be mounted on the main board 2010.

A first aperture APT1 and a second aperture APT2 may be formed on a back portion 11 of the housing case 10, and a front aperture APTF may be formed on a front portion of the housing case 10. A USB terminal 2040, and a headset or earphone terminal 2050 may be formed at a bottom portion of the housing case 10.

The front camera FRCAM may include a front sensor SENF configured to sense a light that is incident through the front aperture APTF.

The light-folding camera 100 may include a plurality of sensors SEN1, SEN2 and SEN3 which are selected or enabled by the light path control device LPC as described above, for example, by the rotating operation of the one or more mirrors (e.g., MRR1, MRR2). The plurality of sensors SEN1, SEN2 and SEN3 may sense a light that is incident through the first aperture APT1. The components of the light-folding camera 100 may be mounted or integrated on the same substrate 50. The substrate 50 may be implemented, for example, as a printed circuit board (PCB).

According to exemplary embodiments, the extra camera EXCAM may be mounted with the light-folding camera 100 on the substrate 50, or the extra camera EXCAM may be implemented as a module distinct from the light-folding camera 100. The extra camera EXCAM may include, for example, an extra sensor SENe configured to sense a light that is incident through the second aperture APT2.

As described above, the light-folding camera and the mobile device according to exemplary embodiments may have a reduced size by sharing a portion of the light path by a plurality of image sensors. Various image magnifications and functions may be efficiently implemented by integrating a plurality of cameras in the light-folding camera.

Exemplary embodiments of the inventive concept may be applied to any devices and systems including a plurality of sensors. For example, exemplary embodiments of the inventive concept may be applied to systems such as a mobile phone, a smartphone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an Internet of things (IoT) device, an Internet of everything (IoE) device, an e-book, a virtual reality (VR) device, an augmented reality (AR) device, etc.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A light-folding camera, comprising:
    a light folding device configured to output a folded light propagating in a first horizontal direction substantially perpendicular to a vertical direction by changing a light path of a vertical light that is incident on the light folding device in the vertical direction;
    a light path control device configured to output a first light propagating in the first horizontal direction by passing at least a first portion of the folded light, or output a second light propagating in a second horizontal direction substantially perpendicular to the vertical direction by changing a light path of at least a second portion of the folded light;
    a first sensor configured to receive the first light propagating in the first horizontal direction; and
    a second sensor configured to receive the second light propagating in the second horizontal direction.

2. The light-folding camera of claim 1, wherein the light path control device comprises:
    a mirror configured to rotate on a rotation axis extending substantially parallel to the vertical direction between a passing position and a reflecting position such that the mirror is aligned to the passing position in a first operation mode and is aligned to the reflecting position in a second operation mode,
    wherein the folded light passes by the mirror and is output as the first light in the first operation mode, and the mirror reflects the folded light and outputs the second light in the second operation mode.

3. The light-folding camera of claim 2, wherein the passing position and the reflecting position of the mirror form a rotation angle of about 45 degrees.

4. The light-folding camera of claim 1, further comprising:
    a common lens disposed between the light folding device and the light path control device, the common lens having a first optical axis extending substantially parallel to the first horizontal direction.

5. The light-folding camera of claim 4, further comprising:
   a first lens disposed between the light path control device and the first sensor, the first lens having the first optical axis; and
   a second lens disposed between the light path control device and the second sensor, the second lens having a second optical axis that intersects with and is substantially perpendicular to the first optical axis.

6. The light-folding camera of claim 5, wherein the common lens, the first lens and the second lens are disposed such that the first sensor receives the first light corresponding to a first field of view, and the second sensor receives the second light corresponding to a second field of view wider than the first field of view.

7. The light-folding camera of claim 1, wherein the light folding device, the light path control device, the first sensor and the second sensor are mounted on a single substrate.

8. The light-folding camera of claim 1, wherein the light path control device comprises:
   a beam splitter configured to output the first light by passing the first portion of the folded light, and simultaneously output the second light by reflecting the second portion of the folded light.

9. A light-folding camera, comprising:
   a light folding device configured to output a folded light propagating in a first horizontal direction substantially perpendicular to a vertical direction by changing a light path of a vertical light that is incident on the light folding device in the vertical direction;
   a first mirror configured to rotate on a first rotation axis extending substantially parallel to the vertical direction between a first passing position and a first reflecting position such that the first mirror is aligned to the first passing position in a first operation mode and is aligned to the first reflecting position in a second operation mode,
   wherein the folded light passes by the first mirror and is output as a first light propagating in the first horizontal direction in the first operation mode, and the first mirror reflects the folded light and outputs a second light propagating in a second horizontal direction substantially perpendicular to the vertical direction in the second operation mode;
   a common lens disposed between the light folding device and the first mirror, the common lens having a first optical axis extending substantially parallel to the first horizontal direction;
   a first sensor configured to receive the first light propagating in the first horizontal direction; and
   a second sensor configured to receive the second light propagating in the second horizontal direction.

10. The light-folding camera of claim 9, further comprising:
    a second mirror disposed between the common lens and the first mirror,
    wherein the second mirror is configured to rotate on a second rotation axis extending substantially parallel to the vertical direction between a second passing position and a second reflecting position such that the second mirror is aligned to the second passing position in the first operation mode and the second operation mode, and is aligned to the second reflecting position in a third operation mode,
    wherein the folded light passes by the second mirror and is output as the first light propagating in the first horizontal direction in the first and second operation modes, and the second mirror reflects the folded light and outputs a third light propagating in the second horizontal direction in the third operation mode; and
    a third sensor configured to receive the third light propagating in the second horizontal direction.

11. The light-folding camera of claim 10, wherein the first passing position and the first reflecting position of the first mirror form a rotation angle of about 45 degrees, and the second passing position and the second reflecting position of the second mirror form a rotation angle of about 45 degrees.

12. The light-folding camera of claim 10, further comprising:
    a first lens disposed between the first mirror and the first sensor, the first lens having the first optical axis;
    a second lens disposed between the first mirror and the second sensor, the second lens having a second optical axis that intersects with and is substantially perpendicular to the first optical axis; and
    a third lens disposed between the second mirror and the third sensor, the third lens having a third optical axis that intersects with and is substantially perpendicular to the first optical axis.

13. The light-folding camera of claim 12, wherein the common lens, the first lens, the second lens and the third lens are disposed such that the first sensor receives the first light corresponding to a first field of view, the second sensor receives the second light corresponding to a second field of view wider than the first field of view, and the third sensor receives the third light corresponding to a third field of view wider than the second field of view.

14. The light-folding camera of claim 10, wherein the light folding device, the first mirror, the second mirror, the first sensor, the second sensor and the third sensor are mounted on a single substrate.

15. The light-folding camera of claim 9, further comprising:
    a third sensor configured to receive a third light propagating in the second horizontal direction,
    wherein the first mirror further rotates on the first rotation axis such that the first mirror is aligned to a second reflecting position in a third operation mode,
    wherein the first mirror reflects the folded light and outputs the third light propagating in the second horizontal direction in the third operation mode.

16. The light-folding camera of claim 15, wherein the first passing position and the first reflecting position of the first mirror form a rotation angle of about 135 degrees, the first passing position and the second reflecting position of the first mirror form a rotation angle of about 45 degrees, and the first reflecting position and the second reflecting position of the first mirror form a rotation angle of about 90 degrees.

17. The light-folding camera of claim 15, wherein the second sensor and the third sensor are disposed on opposite sides of the first optical axis.

18. A mobile device, comprising:
    a housing case;
    a main board mounted in the housing case;
    a light-folding camera mounted in the housing case and electrically connected to the main board; and
    a camera controller configured to control the light-folding camera and process data provided from the light-folding camera,
    wherein the light-folding camera comprises:

a light folding device configured to output a folded light propagating in a first horizontal direction substantially perpendicular to a vertical direction by changing a light path of a first vertical light that is incident on the light folding device in the vertical direction through a first aperture, the first aperture being formed at a surface of the housing case;

a light path control device configured to output a first light propagating in the first horizontal direction by passing at least a first portion of the folded light, or output a second light propagating in a second horizontal direction substantially perpendicular to the vertical direction by changing a light path of at least a second portion of the folded light;

a first sensor configured to receive the first light propagating in the first horizontal direction; and a second sensor configured to receive the second light propagating in the second horizontal direction.

19. The mobile device of claim 18, wherein the camera controller receives first image data corresponding to a first field of view from the first sensor and second image data corresponding to a second field of view wider than the first field of view from the second sensor, and generates fusion image data corresponding to an intermediate field of view wider than the first field of view and narrower than the second field of view based on the first image data and the second image data.

20. The mobile device of claim 18, further comprising:

an extra camera, comprising:

an extra sensor configured to receive a second vertical light that is incident in the vertical direction through a second aperture, the second aperture being formed at the surface of the housing case; and an extra lens disposed between the second aperture and the extra sensor.

* * * * *